(12) United States Patent
Kawamura et al.

(10) Patent No.: US 7,430,863 B2
(45) Date of Patent: Oct. 7, 2008

(54) PUMP UNIT AND HYDROSTATIC TRANSMISSION

(75) Inventors: Masahisa Kawamura, Hyogo (JP); Ryota Ohashi, Hyogo (JP); Hironori Sumomozawa, Hyogo (JP); Takeaki Nozaki, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 11/746,945

(22) Filed: May 10, 2007

(65) Prior Publication Data

US 2007/0209355 A1    Sep. 13, 2007

Related U.S. Application Data

(62) Division of application No. 11/269,643, filed on Nov. 9, 2005, now Pat. No. 7,231,765.

(30) Foreign Application Priority Data

Nov. 25, 2004   (JP)   ............................. 2004-340101

(51) Int. Cl.
*B60K 17/28* (2006.01)
*A01D 34/76* (2006.01)
(52) U.S. Cl. .......................... 60/487; 60/488
(58) Field of Classification Search ............ 60/487, 60/488, 413
See application file for complete search history.

(56) References Cited

U.S. PATENT DOCUMENTS

| 5,069,037 | A | 12/1991 | Sakigawa et al. |
| 6,571,894 | B2 * | 6/2003 | Ishimaru et al. ............... 60/487 |
| 6,619,038 | B2 | 9/2003 | Takada et al. |

FOREIGN PATENT DOCUMENTS

| EP | 1 350 421 A1 | 10/2003 |
| EP | 1 473 183 A2 | 11/2004 |
| JP | 2003-291674 | 10/2003 |

OTHER PUBLICATIONS

International Search Report for European Application No. EP 05022808.9-1254, European Patent Office, mailed Jun. 18, 2008, 7 pgs.

* cited by examiner

*Primary Examiner*—Thomas E Lazo
(74) *Attorney, Agent, or Firm*—Sterne, Kessler, Goldstein & Fox P.L.L.C.

(57) ABSTRACT

There is provided a pump unit configured to be capable of transmitting a rotational power from a driving power source which is operatively connected thereto to an actuator through a pair of hydraulic fluid lines. The pump unit includes: an input shaft; a hydraulic pump main body; a PTO shaft; a PTO clutch mechanism; an auxiliary pump main body; a suction line; a discharge line; a charge line; a PTO hydraulic fluid line; a pressure-reducing valve; and a resistance valve. The PTO hydraulic fluid line and the charge line are fluidly connected to the primary side and a secondary side of the pressure-reducing valve, respectively.

6 Claims, 20 Drawing Sheets

PUMP UNIT AND HYDROSTATIC TRANSMISSION

CROSS-REFERENCE TO RELATED APPLICATIONS

This application is a divisional of U.S. application Ser. No. 11/269,643, filed Nov. 9, 2005, the entire disclosure of which are hereby incorporated by reference.

BACKGROUND OF THE INVENTION

1. Field of the Invention

The present invention relates to a pump unit and a hydrostatic transmission.

2. Related Art

It has been conventionally known that, in pump units configured to be capable of transmitting a rotational power from a driving power source that is operatively connected thereto to an actuator through a pair of hydraulic fluid lines, and in hydrostatic transmissions (hereinafter, also referred to HST) which non-stepwisely change the speed of a rotational power from a driving power source which is operatively connected thereto by using the hydraulic pressure of hydraulic fluid flowing through a pair of hydraulic fluid lines, there is provided a PTO transmission mechanism for branching and outputting the power from the driving power source.

In pump units or hydrostatic transmissions as described above, there may be provided an auxiliary pump main body which is operatively driven by the driving power source in order to supply hydraulic fluid for replenishing to the pair of hydraulic fluid lines and supply hydraulic fluid for operating to the PTO clutch mechanism provided in the PTO transmission mechanism (refer to, for example, JP-A 2003-291674).

A conventional pump unit or conventional hydrostatic transmission includes a suction line for fluidly communicating between a suction port of the auxiliary pump main body and a fluid reservoir, a discharge line which is fluidly connected to a discharge port of the auxiliary pump main body, a charge line which is branched from the discharge line via a pressure-reducing valve for supplying hydraulic fluid for replenishing to the pair of hydraulic fluid lines, and a PTO hydraulic fluid line which is branched from the discharge line via the pressure-reducing valve for supplying hydraulic fluid for operating to the aforementioned PTO clutch mechanism.

In the conventional pump unit or the hydrostatic transmission, the charge line is fluidly connected to a secondary side of the pressure-reducing valve and the PTO hydraulic fluid line is fluidly connected to a spring chamber of the pressure-reducing valve. Consequently, when the PTO clutch mechanism is engaged or disengaged, the hydraulic pressure in the charge line is fluctuated, thus causing the malfunction of fluctuations in the operation torque of the output-adjusting member used for changing and operating the suction/discharge rate of the hydraulic pump main body.

Namely, the pressure-reducing valve is configured to be capable of defining the hydraulic pressure in the charge line to a predetermined hydraulic pressure with a hydraulic pressure setting spring placed within the spring chamber and, as previously described, a conventional pump unit or hydrostatic transmission is configured such that the PTO hydraulic fluid line is supplied with hydraulic fluid from the spring chamber of the pressure-reducing valve.

In the PTO hydraulic fluid line, there is inserted a PTO relief valve for setting the hydraulic pressure in the PTO clutch mechanism, in addition to a switching valve for switching between supply and interruption of hydraulic fluid to the PTO clutch mechanism. Therefore, when the PTO clutch mechanism is disengaged, the PTO hydraulic fluid line is at a natural pressure that is communicated with the fluid reservoir, while when the PTO clutch mechanism is engaged, it is set to an operational pressure defined by the PTO relief valve.

Consequently, within the spring chamber of the pressure-reducing valve connected to the PTO hydraulic fluid line, the hydraulic pressure is varied along with the hydraulic pressure fluctuation in the PTO hydraulic fluid line. Thus, the hydraulic pressure in the charge line, which is defined by the hydraulic pressure setting spring within the spring chamber, is also varied along with the hydraulic pressure fluctuation in the PTO hydraulic fluid line.

As described above, with conventional pump units and hydrostatic transmissions, there have been caused malfunctions of fluctuation in the operation torque of the output-adjusting member of the hydraulic pump main body due to the difference of the hydraulic pressure in the charge line between when the PTO clutch mechanism is engaged and when it is disengaged.

Also, in order to gradually raise the hydraulic pressure in the PTO hydraulic fluid line to the hydraulic pressure defined by the PTO relief valve for preventing abrupt engaging movement of the PTO clutch mechanism, an accumulator may be inserted in the PTO hydraulic fluid line, in some cases.

However, sufficient considerations have not been given to the placement of such an accumulator in conventional pump units and hydrostatic transmissions.

Also, pump units as described above may include a pair of hydraulic pump main bodies. Such pump units are configured to be capable of transmitting a rotational power from a driving power source which is operatively connected thereto to first and second hydraulic motor units for driving the left and right driving wheels through a pair of first hydraulic fluid lines and a pair of second hydraulic fluid lines.

Namely, in the pump unit, the pair of hydraulic pump main bodies and the pair of hydraulic motor units form a pair of HSTs for individually driving the pair of left and right driving wheels.

However, with a conventional pump unit including such a pair of hydraulic pump main bodies, even though the respective output-adjusting members in the pair of HSTs are operated such that the pair of hydraulic motor units are brought into the same output state, there may occur output differences between the pair of hydraulic motor units due to fabrication errors and assembly errors.

Such output differences between the pair of hydraulic motor units may cause a so-called wandering phenomenon that the vehicle meanders even though the vehicle is manipulated such that it linearly moves.

The present invention was made in view of the aforementioned prior art. It is an object of the present invention to provide pump units or hydrostatic transmissions including a PTO clutch mechanism, the pump units or hydrostatic transmission being capable of maintaining the charge pressure for a pair of hydraulic fluid lines constant, regardless of whether the PTO clutch mechanism is engaged or disengaged.

It is another object of the present invention to provide pump units or hydrostatic transmissions including an accumulator for gradually raising the hydraulic pressure of hydraulic fluid for the PTO clutch mechanism, the pump units or hydrostatic transmissions being capable of preventing the increase of the apparatus size and also enhancing a piping workability for the accumulator.

It is still another object of the present invention to provide a pump unit for vehicle-traveling configured to include a pair of hydraulic pump main bodies which are operatively connected to a driving power source and transmit a rotational power from the driving power source to first and second hydraulic motor units for driving right and left driving wheels, through a pair of first hydraulic fluid lines and a pair of second hydraulic fluid lines, the pump units being capable of individually driving the right and left driving wheels in a variable-speed manner and effectively preventing the occurrence of wandering phenomena during straight-movement operation of the vehicle.

SUMMARY OF THE INVENTION

According to one aspect of the present invention, there is provided a pump unit configured to be capable of transmitting a rotational power from a driving power source which is operatively connected thereto to an actuator through a pair of hydraulic fluid lines.

The pump unit includes: an input shaft which is operatively connected to the driving power source; a hydraulic pump main body which is operatively driven by the input shaft and is fluidly connected to the actuator through the pair of hydraulic fluid lines; a PTO shaft which is operatively driven by the input shaft; a PTO clutch mechanism which is inserted in a transmission path from the input shaft to the PTO shaft; an auxiliary pump main body; a suction line which has a first end fluidly connected to a fluid reservoir and a second end fluidly connected to a suction port of the auxiliary pump main body; a discharge line which is fluidly connected to the discharge port of the auxiliary pump main body; a charge line which supplies a part of hydraulic fluid from the discharge line to the pair of hydraulic fluid lines through check valves; a PTO hydraulic fluid line which supplies a part of hydraulic fluid from the discharge line to the PTO clutch mechanism through a PTO relief valve; a pressure-reducing valve which has a primary side fluidly connected to the discharge line; and a resistance valve which is fluidly connected to the primary side of the pressure-reducing valve.

In the pump unit, the PTO hydraulic fluid line and the charge line are fluidly connected to the primary side and a secondary side of the pressure-reducing valve, respectively.

With this configuration, it is possible to maintain the hydraulic pressure in the charge line at the charge pressure defined by the pressure-reducing valve, without affected by hydraulic pressure fluctuations in the PTO hydraulic fluid line.

Therefore, the charge pressure for the pair of hydraulic fluid lines could be maintained regardless of whether the PTO clutch mechanism is engaged or disengaged, thereby the operation torque of the output-adjusting member being constant.

Preferably, the pump unit further includes a drain line which fluidly connects a secondary side of the resistance valve to the fluid reservoir. The drain line is so configured to have an oil cooler inserted therein.

In one embodiment, the pump unit may include a drain line which fluidly connects the secondary side of the resistance valve to the fluid reservoir; and an external hydraulic fluid extraction line which is branched off from the drain line.

In the one embodiment, preferably, the pump unit further includes an external hydraulic pressure relief valve which has a primary side fluidly connected to the discharge line. The hydraulic pressure in the external hydraulic fluid extraction line is set by the external hydraulic pressure relief valve.

More preferably, the pump unit further includes a return line which has a first end fluidly connected to the discharge line and a second end fluidly connected to the suction line. The external hydraulic pressure relief valve is inserted in the return line.

In the above various configurations, the PTO hydraulic fluid line may be fluidly connected to the primary side of the pressure-reducing valve through an orifice.

According to one aspect of the present invention, there is also provided a hydrostatic transmission for vehicle traveling, which non-stepwisely changes a speed of a rotational power from a driving power source which is operatively connected thereto by means of hydraulic actions.

The hydrostatic transmission includes: an input shaft which is operatively connected to the driving power source; a hydraulic pump main body which is operatively driven by the input shaft; a hydraulic motor main body which is fluidly connected to the hydraulic pump main body; a motor shaft which is rotated and driven by the hydraulic motor main body, and operatively connected to a driving wheel; a PTO shaft which is operatively driven by the input shaft; a PTO clutch mechanism which is inserted in a transmission path from the input shaft to the PTO shaft; an auxiliary pump main body; a pair of hydraulic fluid lines which fluidly connects the hydraulic pump main body to the hydraulic motor main body; a suction line which has a first end fluidly connected to a fluid reservoir and a second end fluidly connected to a suction port of the auxiliary pump main body; a discharge line which is fluidly connected to a discharge port of the auxiliary pump main body; a charge line which supplies a part of hydraulic fluid from the discharge line to the pair of hydraulic fluid lines through check valves; a PTO hydraulic fluid line which supplies a part of hydraulic fluid from the discharge line to the PTO clutch mechanism through a PTO relief valve; a pressure-reducing valve which has a primary side fluidly connected to the discharge line; and a resistance valve which is fluidly connected to the primary side of the pressure-reducing valve.

In the thus configured pump unit, the PTO hydraulic fluid line and the charge line are fluidly connected to the primary side and a secondary side of the pressure-reducing valve, respectively.

With this configuration, it is possible to maintain the hydraulic pressure in the charge line at the charge pressure defined by the pressure-reducing valve, without affected by hydraulic pressure fluctuations in the PTO hydraulic fluid line.

Therefore, the charge pressure for the pair of hydraulic fluid lines could be maintained regardless of whether the PTO clutch mechanism is engaged or disengaged, thereby the operation torque of the output-adjusting member being constant.

Preferably, the hydrostatic transmission may further include a drain line which fluidly connects a secondary side of the resistance valve to the fluid reservoir. The drain line is so configured to have an oil cooler inserted therein.

In one embodiment, the hydrostatic transmission further includes a drain line which fluidly connects the secondary side of the resistance valve to the fluid reservoir; and an external hydraulic fluid extraction line which is branched off from the drain line.

In the one embodiment, preferably, the hydrostatic transmission further includes an external hydraulic pressure relief valve which has a primary side fluidly connected to the discharge line. The hydraulic pressure in the external hydraulic fluid extraction line is set by the external hydraulic pressure relief valve.

In the one embodiment, more preferably, the hydrostatic transmission further includes a return line which has a first end fluidly connected to the discharge line and a second end fluidly connected to the suction line. The external hydraulic pressure relief valve is inserted in the return line.

In the above various configurations, preferably, the PTO hydraulic fluid line may be fluidly connected to the primary side of the pressure-reducing valve through an orifice.

According to another aspect of the present invention, there is provided a pump unit configured to be capable of transmitting a rotational power from a driving power source which is operatively connected thereto to an actuator through a pair of hydraulic fluid lines.

The pump unit includes: an input shaft which is operatively connected to the driving power source; a hydraulic pump main body which is operatively driven by the input shaft and is fluidly connected to the actuator through the pair of hydraulic fluid lines; a PTO shaft which is operatively driven by the input shaft; a PTO clutch mechanism which is inserted in a transmission path from the input shaft to the PTO shaft; an auxiliary pump main body; a housing which accommodates the hydraulic pump main body and the PTO clutch mechanism; a discharge line which is fluidly connected to a discharge port of the auxiliary pump main body; a PTO hydraulic fluid line which is fluidly connected to the discharge line and supplies hydraulic fluid to the PTO clutch mechanism; a PTO relief valve which sets the hydraulic pressure in the PTO hydraulic fluid line; and an accumulator which is inserted in the PTO hydraulic fluid line and raises the hydraulic pressure in the PTO hydraulic fluid line to the pressure set by the PTO relief valve. The accumulator is incorporated in the housing.

With this configuration, it is possible to enhance the efficiency of piping operation and prevent leakage of PTO hydraulic fluid with reducing the size of the entire apparatus.

For example, the housing includes: a housing main body which is provided with an opening for allowing the hydraulic pump main body to pass therethrough, the opening being provided at one side in the direction of a rotation axis of the hydraulic pump main body; and a port block which is detachably connected to the housing main body such that it abuts the hydraulic pump main body and closes the opening of the housing main body in a liquid-tight manner, the port block being provided with a pair of hydraulic fluid passages forming a part of the pair of hydraulic fluid lines.

The housing main body includes a first end-face portion provided with the opening, a second end-face portion positioned at the opposite side from the first end-face portion with respect to the direction of the rotation axis of the hydraulic pump main body, and a wall portion extending in the direction of the rotation axis of the hydraulic pump main body between the first end-face portion and the second end-face portion.

In one embodiment, the accumulator may be incorporated within the wall portion such that its axis is along the direction of the rotation axis of the hydraulic pump main body.

In another embodiment, the accumulator is incorporated within the first end-face portion or the second end-face portion such that its axis is substantially orthogonal to the direction of the rotation axis of the hydraulic pump main body.

According to another aspect of the present invention, there is provided a hydrostatic transmission which non-stepwisely changes a speed of a rotational power from a driving power source which is operatively connected thereto by means of hydraulic actions.

The hydrostatic transmission includes: an input shaft which is operatively connected to the driving power source; a hydraulic pump main body which is operatively driven by the input shaft; a hydraulic motor main body which is fluidly connected to the hydraulic pump main body; a motor shaft which is rotated and driven by the hydraulic motor main body; a PTO shaft which is operatively driven by the input shaft; a PTO clutch mechanism which is inserted in a transmission path from the input shaft to the PTO shaft; an auxiliary pump main body; a housing which accommodates the hydraulic pump main body, the hydraulic motor main body and the PTO clutch mechanism; a discharge line which is fluidly connected to a discharge port of the auxiliary pump main body; a PTO hydraulic fluid line which is fluidly connected to the discharge line and supplies hydraulic fluid to the PTO clutch mechanism; a PTO relief valve which sets the hydraulic pressure in the PTO hydraulic fluid line; and an accumulator which is inserted in the PTO hydraulic fluid line and gradually raises the hydraulic pressure in the PTO hydraulic fluid line to the pressure set by the PTO relief valve. The accumulator is incorporated in the housing.

With this configuration, it is possible to enhance the efficiency of piping operation and prevent leakage of PTO hydraulic fluid with reducing the size of the entire apparatus.

For example, the housing includes: a housing main body which is provided with an opening for allowing the hydraulic pump main body and the hydraulic motor main body to pass therethrough, the opening being provided at one side in the direction of the rotation axis of the hydraulic pump main body; and a port block which is detachably connected to the housing main body such that it abuts the hydraulic pump main body and the hydraulic motor main body, and closes the opening of the housing main body in a liquid-tight manner, the port block being provided with a pair of hydraulic fluid passages which fluidly connect the hydraulic pump main body and the hydraulic motor main body to each other.

The housing main body includes a first end-face portion provided with the opening, a second end-face portion positioned at the opposite side from the first end-face portion with respect to the direction of the rotation axis of the hydraulic pump main body and a wall portion extending in the direction of the rotation axis of the hydraulic pump main body between the first end-face portion and the second end-face portion.

In one embodiment, the accumulator may be incorporated within the wall portion such that its axis is along the direction of the rotation axis of the hydraulic pump main body.

In another embodiment, the accumulator is incorporated within the first end-face portion or the second end-face portion such that its axis is substantially orthogonal to the direction of the rotation axis of the hydraulic pump main body.

According to still another aspect of the present invention, there is provided a pump unit for vehicle traveling configured to be capable of transmitting a rotational power through a pair of first hydraulic fluid lines and a pair of second hydraulic fluid lines from a driving power source which is operatively connected thereto to first and second hydraulic motor units for driving right and left driving wheels.

The pump unit includes: an input shaft which is operatively connected to the driving power source; first and second hydraulic pump main bodies which are operatively driven by the input shaft and are fluidly connected to the first and second motor units through the pair of first hydraulic fluid lines and the pair of second hydraulic fluid lines; a housing main body which surrounds the first and second hydraulic pump main bodies; a port block which abuts and supports the first and second hydraulic pump main bodies, and defines the accommodating space for the first and second hydraulic pump main bodies in cooperation with the housing main body; and a communication line which communicates between a forward-movement high-pressure side first hydraulic fluid line, which is brought into higher pressure during forward movement, out of the pair of first hydraulic fluid lines and a forward-movement high-pressure side second hydraulic fluid line, which is brought into higher pressure during forward movement, out of the pair of second hydraulic fluid lines, the communication line having an orifice inserted therein.

With this configuration, it is possible to maintain the individual transmissions of the first HST formed by the first hydraulic pump main body and the first hydraulic motor unit and the second HST formed by the second hydraulic pump main body and the second hydraulic motor unit, while effectively preventing the occurrence of wandering phenomena that the vehicle meanders even though the first HST and the second HST are operated such that they are brought into the same output state for moving the vehicle straightly.

Preferably, the port block is provided with a pair of first hydraulic fluid passages and a pair of second hydraulic fluid passages which form a part of the pair of first hydraulic fluid lines and the pair of second hydraulic fluid lines, respectively, and the communication line is configured to communicate between a forward-movement high-pressure side first hydraulic fluid passage, which is brought into higher pressure during forward movement, out of the pair of first hydraulic fluid passages and a forward-movement high-pressure side second hydraulic fluid passage, which is brought into higher pressure during forward movement, out of the pair of second hydraulic fluid passages.

In one embodiment, the pair of first hydraulic fluid passages and the pair of second hydraulic fluid passages are formed to be substantially parallel to each other, and the communication line has a communication fluid passage formed in the port block such that it is orthogonal to the pair of first hydraulic fluid passages and the pair of second hydraulic fluid passages.

Preferably, the forward-movement high-pressure side first hydraulic fluid passage and the forward-movement high-pressure side second hydraulic fluid passage are placed adjacent to each other.

In another embodiment, the communication line has a conduit which is detachably connected to the port block such that it communicates the forward-movement high-pressure side first hydraulic fluid passage and the forward-movement high-pressure side second hydraulic fluid passage to each other.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment 1

Hereinafter, a preferred embodiment of a pump unit according to the present invention will be described with reference to the attached drawings.

Figure 1:
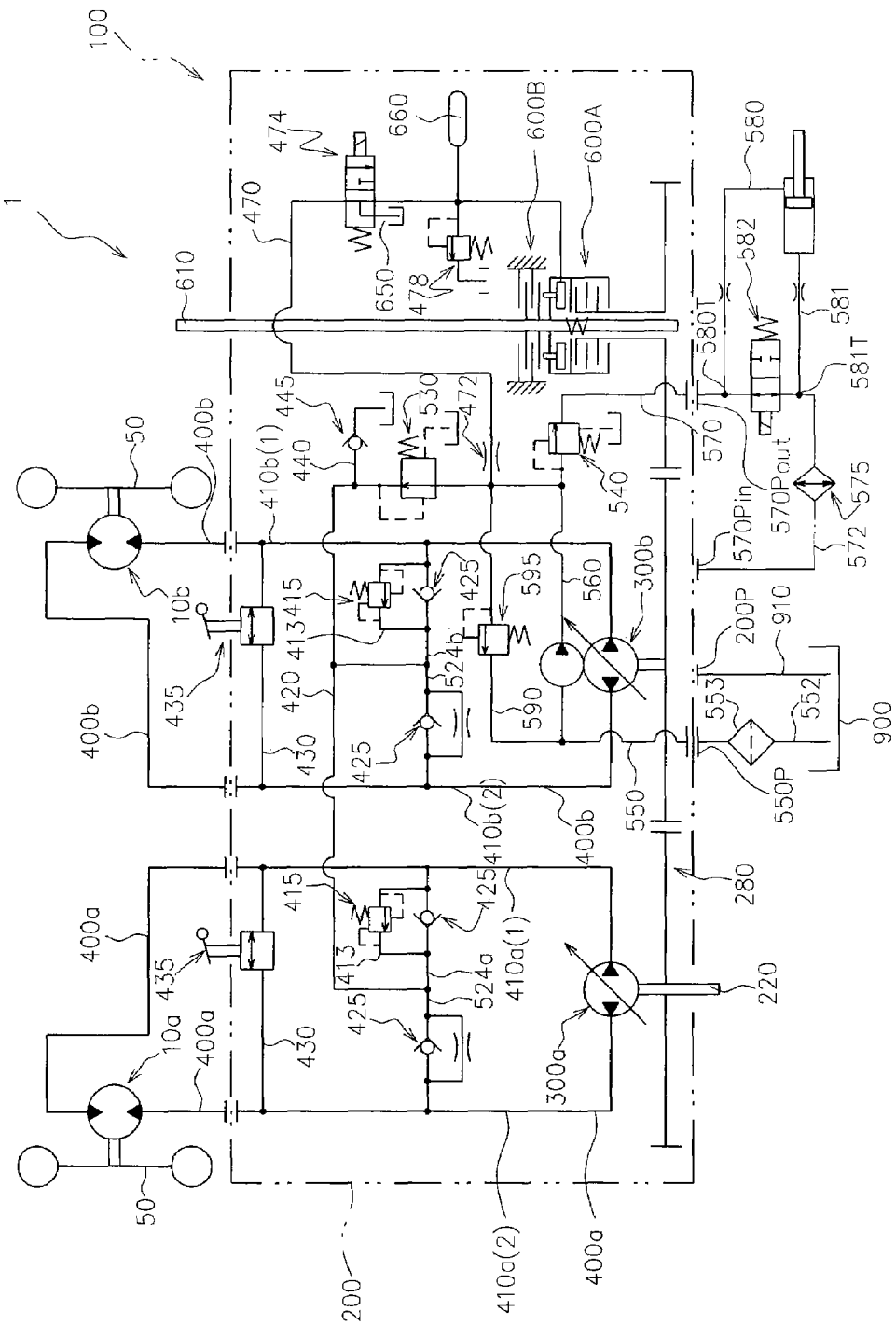
FIG. 1 is an oil hydraulic circuit diagram of a working vehicle to which a pump unit according to a first embodiment of the present invention is applied.
Figure 2:
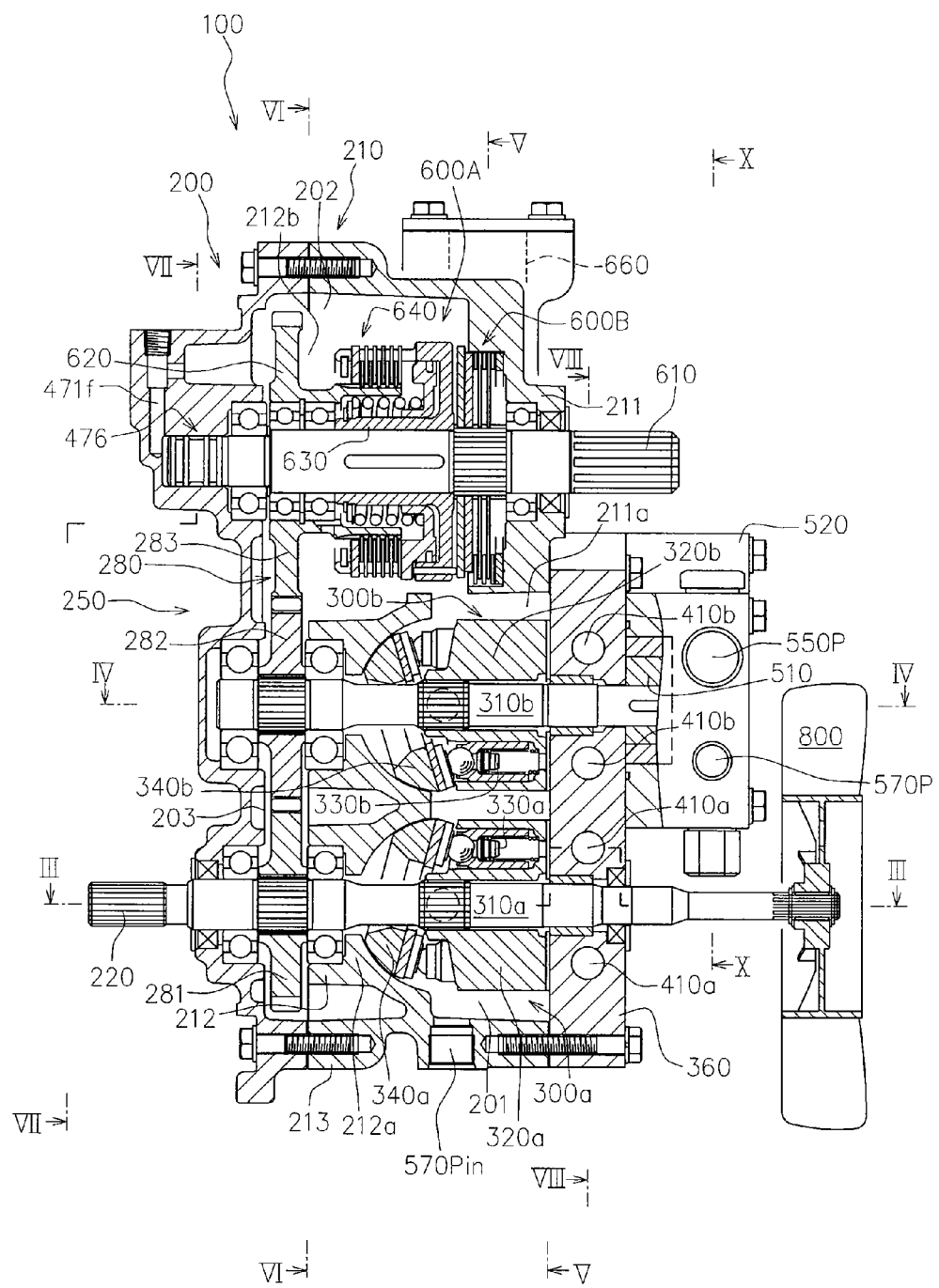
FIG. 2 is a cross-sectional plan view of the pump unit of the first embodiment.
Figure 3:
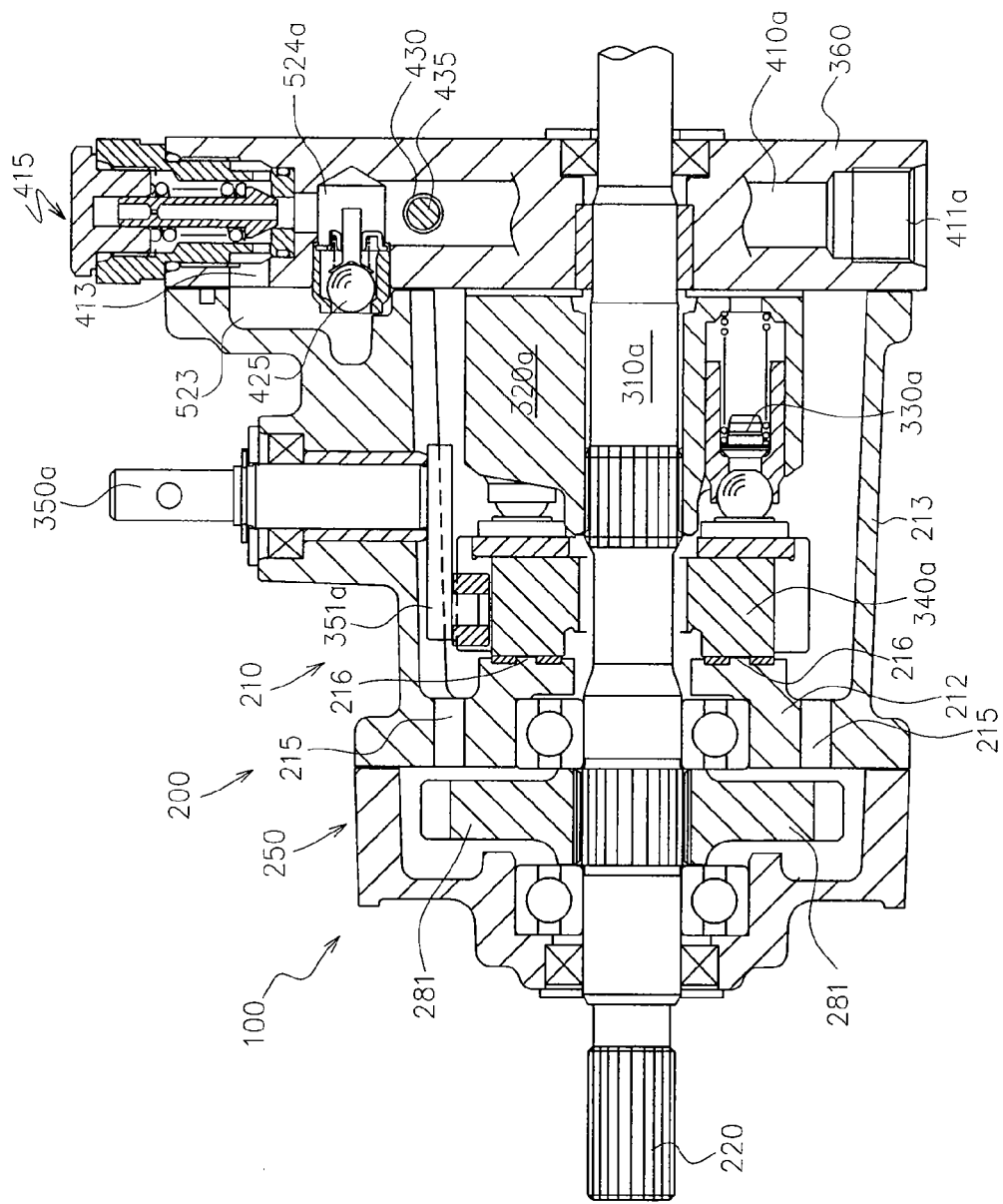
FIG. 3 is a longitudinal cross-sectional side view of the pump unit taken along a line III-III in FIG. 2.
Figure 4:
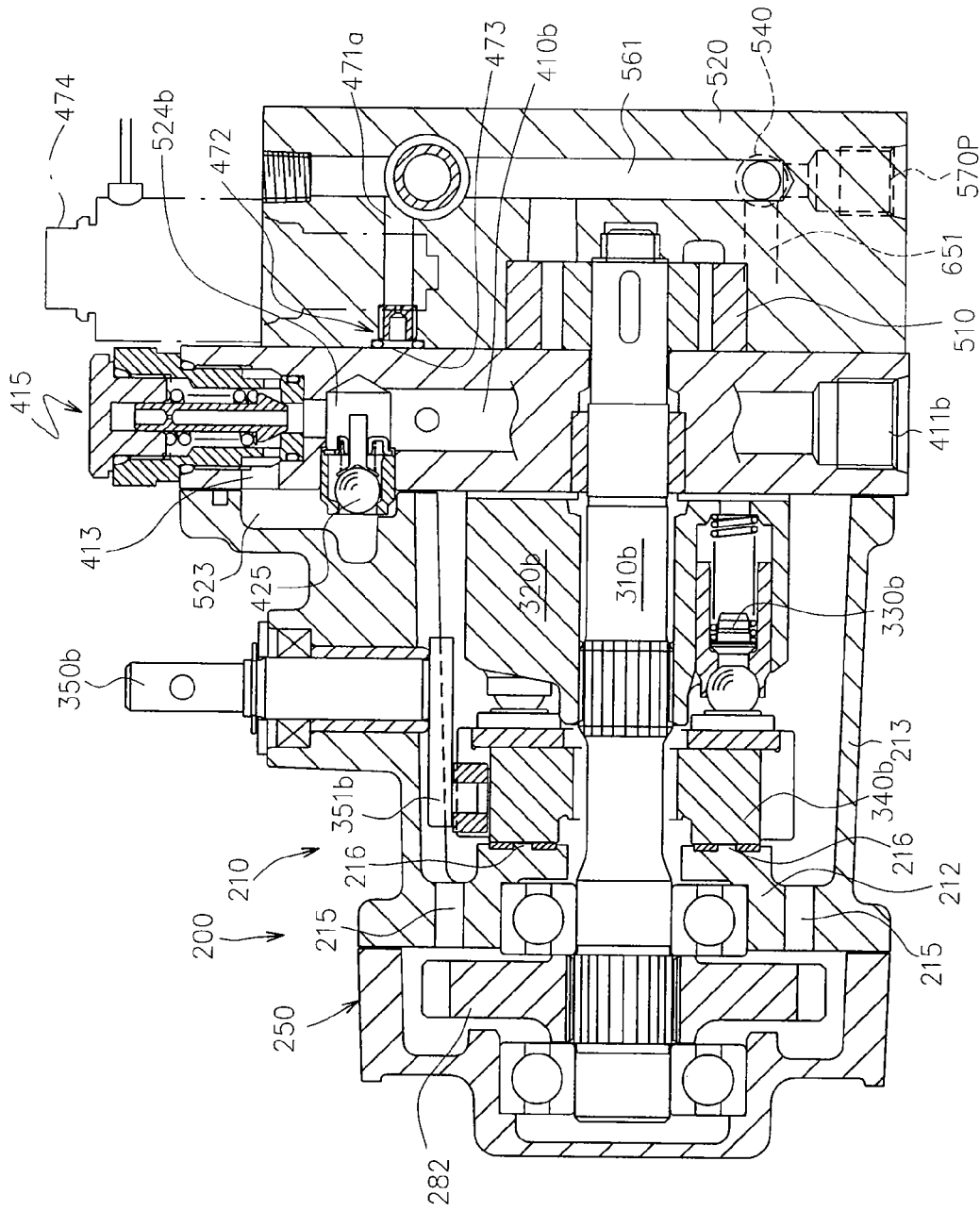
FIG. 4 is a longitudinal cross-sectional side view of the pump unit taken along a line IV-IV in FIG. 2.

FIG. 1 illustrates an oil hydraulic circuit diagram of a working vehicle 1 to which a pump unit according to this embodiment is applied. FIG. 2 illustrates a cross-sectional plan view of the pump unit 100 according to this embodiment. FIG. 3 and FIG. 4 are longitudinal cross-sectional side views of the pump unit 100 taken along a line III-III and a line IV-IV in FIG. 2, respectively.

The pump unit 100 according to this embodiment is configured to form a main transmission path for transmitting the rotational power from a driving power source (not shown) to an actuator through a pair of hydraulic fluid lines 400a and 400b and also is configured to form a secondary transmission path for diverging and outputting the rotational power from the driving power source to the outside.

More specifically, as illustrated in FIG. 1 to FIG. 4, the pump unit 100 includes an input shaft 220 which is operatively connected to the driving power source, hydraulic pump main bodies 300a and 300b which are operatively driven by the input shaft 220 and are fluidly connected to the aforementioned actuator through the pair of hydraulic fluid lines 400a and 400b, a PTO shaft 610 which is operatively driven by the input shaft 220, and a PTO clutch mechanism 600A inserted in the transmission path from the input shaft 200 to the PTO shaft 610, wherein the hydraulic pump main bodies 300a and 300b form a part of the main transmission path while the PTO shaft 610 and the PTO clutch mechanism 600A form a part of the secondary transmission path.

Further, the pump unit 100 according to this embodiment includes a PTO braking mechanism 600B which operates in conjunction with the PTO clutch mechanism 600A. The PTO braking mechanism 600B is provided in order to prevent the PTO shaft 610 from being continuously rotated due to an inertial force when the power to the PTO shaft 610 from the input shaft 220 is shutoff.

In this embodiment, the pump unit 100 includes a pair of first and second hydraulic pump main bodies 300a and 300b as the aforementioned hydraulic pump main bodies.

The pair of first and second hydraulic pump main bodies 300a and 300b are fluidly connected to a pair of first and second hydraulic motor units 10a and 10b which serve as the aforementioned actuator through the pair of first and second hydraulic fluid lines 400a and 400b, respectively. The first hydraulic pump main body 300a and the first hydraulic motor unit 10a form a first HST for vehicle-traveling which drives one of a pair of driving wheels 50 with variable rotational speeds. The second hydraulic pump main body 300b and the second hydraulic motor unit 10b form a second HST for vehicle-traveling which drives the other one of the pair of driving wheels 50 with variable rotational speeds.

Namely, out of the first hydraulic pump main body 300a and the motor main body in the first hydraulic motor unit 10a, at least one of them is of a variable displacement type.

Similarly, out of the second hydraulic pump main body 300b and the motor main body in the second hydraulic motor unit 10b, at least one of them is of a variable displacement type.

In this embodiment, the first and second hydraulic pump main bodies 300a and 300b are of a variable displacement type while the first and second hydraulic motor units 10a and 10a are of a fixed displacement type.

More specifically, the pump unit 100 includes a housing 200 which supports the input shaft 220 and the PTO shaft 610 and accommodates the first and second hydraulic pump main bodies 300a and 300b and the PTO clutch mechanism 600A, and a transmission mechanism 280 which transmits the power from the input shaft 220 to the first hydraulic pump main body 300a, the second hydraulic pump main body 300b and the PTO clutch mechanism 600A and also is accommodated within the housing 200, in addition to the input shaft 200, the first and second hydraulic pump main bodies 300a and 300b, the PTO shaft 610 and the PTO clutch mechanism 600A.

FIG. 5 to FIG. 8 illustrate cross-sectional views taken along a line V-V, a line VI-VI, a line VII-VII and a line VIII-VIII in FIG. 2, respectively.

As illustrated in FIG. 2 and FIG. 5 to FIG. 7, the housing 200 includes a housing main body 210 which accommodates the first and second hydraulic pump main bodies 300a and 300b and the PTO clutch mechanism 600A, a center section (port block) 360 which is detachably connected to the housing main body 210 and is provided with fluid passages fluidly communicated with the first and second hydraulic pump main bodies 300a and 300b, and a cover member 250 which is detachably connected to the housing main body 210 at the opposite side from the port block 360 in the direction of the rotation axes of the hydraulic pump main bodies 300a and 300b.

In this embodiment, the first and second hydraulic pump main bodies 300a and 300b are accommodated within the housing 200 such that the directions of their rotation axes are in parallel with each other along the fore-to-aft direction of the vehicle. Further, the PTO shaft 610 is also supported by the housing 200 such that the rotation axis thereof is in parallel with the direction of the rotation axes of the first and second hydraulic pump main bodies 300a and 300b.

More specifically, as illustrated in FIG. 2, the housing main body 210 includes a first end-face portion 211 positioned at one side in the direction of the rotation axes of the first and second hydraulic pump main bodies 300a and 300b, a second end-face portion 212 spaced apart from the first end-face portion 211 at the other side in the direction of the rotation axes, and a wall portion 213 extending along the direction of the rotation axes between the first end-face portion 211 and the second end-face portion 212.

The first end-face portion 211 includes a first opening 211a which allows the first and second hydraulic pump main bodies 300a and 300b to pass therethrough, at the one side in the widthwise direction of the housing main body 210.

Further, the first opening 211a is liquid-tightly sealed with the port block 360.

Namely, the housing 200 is configured to define a pump accommodating space 201 for accommodating the first and second hydraulic pump main bodies 300a and 300b between the port block 360 and the second end-face portion 212 (see FIG. 2).

The second end-face portion 212 includes a swash plate receiving portion 212a having a concave arc-shaped guiding surface for slidably abutting and supporting a movable swash plate 353 which will be described later of the first and second hydraulic pump main bodies 300a and 300b at the position corresponding to the pump accommodating space 201, and a second opening 212b which allows the PTO clutch mechanism 600A to pass therethrough at the other side of the housing 200 in the vehicle-widthwise direction (see FIG. 2).

Further, the second opening 212b is liquid-tightly sealed with the cover member 250.

Namely, the housing 200 is configured to define a PTO clutch accommodating space 202 for accommodating the PTO clutch mechanism 600A between the cover member 250 and the first end-face portion 211.

As described above, in this embodiment, the internal space of the housing 200, which is defined by the port block 360 and the second end-face portion 212, at one side in the widthwise direction is utilized as the pump accommodating space 201 while the internal space of the housing 200, which is defined by the cover member 250 and the first end-face portion 211, at the other side in the widthwise direction is utilized as the PTO clutch accommodating space 202.

Further, in this embodiment, the swash plate receiving portion 212a is formed integrally with the housing main body 210 and, accordingly, the first opening 211a which allows the first and second hydraulic pump main bodies 300a and 300b to pass therethrough and the second opening 212b which allows the PTO clutch mechanism 600A to pass therethrough are provided at one side and the other side in the direction of the rotation axes of the first and second hydraulic pump main bodies 300a and 300b. However, instead thereof, the swash plate receiving portion 212a may be formed separately from the housing main body 210.

By forming the swash plate receiving portion 212a separately from the housing main body 210, it is possible to eliminate the necessity of the second end-face portion 212. Consequently, when molding the housing main body 210, it is possible to pull out the respective molds for forming the hydraulic pump housing portion 201 and the PTO clutch housing portion 202 in the same direction.

The cover member 250 is detachably connected to the housing main body 210 so as to form a transmission mechanism accommodating space 203 (see FIG. 2) for accommodating the transmission mechanism 280 between the cover member 250 and the second end-face portion 212 of the housing main body 210.

Further, as illustrated in FIG. 3, the second end-face portion 212 may be provided with a communication channel 215 which allows fluid to freely flow between the hydraulic pump accommodating space 201 and the transmission mechanism accommodating space 203.

As illustrated in FIG. 2 and FIG. 3, the input shaft 220 is supported by the housing 200 in a state where its first end at the upstream side in the direction of transmission is outwardly extended from the housing 200 so as to be operatively connected to the driving power source.

In this embodiment, the input shaft 200 is formed integrally with a first pump shaft 310*a* of the first hydraulic pump main body 300*a*.

In this embodiment, the first hydraulic pump main body 300*a* is of an axial piston type as illustrated in FIG. 2 and FIG. 3.

More specifically, the first hydraulic pump main body 300*a* includes the first pump shaft 310*a* which is operatively connected to the input shaft 220, a first cylinder block 320*a* supported on the first pump shaft 310*a* in a relatively non-rotatable manner, and a first piston unit 330*a* accommodated within the cylinder block 320*a* in a relatively non-rotatable manner and a relatively axially slidable manner.

As previously described, in this embodiment, the first hydraulic pump main body 300*a* is of a variable displacement type.

Consequently, in addition to the aforementioned structures, the first hydraulic pump main body 300*a* includes an output-adjusting member 340*a* for changing the range of sliding of the piston unit 330*a* to adjust the suction/discharge rate.

In this embodiment, a cradle-type movable swash plate is employed as the output-adjusting member 340*a*.

More specifically, the movable swash plate 340*a* has a convex arc-shaped rear surface which is in intimate contact with a thrust metal secured on the concave arc-shaped surface of the swash plate receiving portion 212*a* so that the movable swash plate 340*a* is slidably supported, and a front surface which is abutted against a shoe provided at the tip end of the piston unit 330*a*. Further, there is provided a thrust metal engaging protrusion 216 for preventing the inclination of the thrust metal, at the deepest portion of the concave arc-shaped surface of the swash plate receiving portion 212*a* (see FIG. 3).

Further, the output-adjusting member 340*a* can be manipulated from outside using a control shaft 350*a* which is connected thereto through an arm 351*a* (see FIG. 3).

As previously described, in this embodiment, a first side of the first pump shaft 310*a* is formed integrally with the input shaft 220 which is outwardly extended.

Further, as illustrated in FIG. 2 and FIG. 3, a second side of the first pump shaft 310*a* is supported by the port block 360, the second end-face portion 212 and the cover member 250 in a relatively rotatable manner about its axis, at a state where the second side at the downstream-side end portion in the direction of transmission is outwardly extended through the port block 360.

In this embodiment, a cooling fan 800 is provided on the second side of the first pump shaft 310*a* (see FIG. 2).

Obviously, the outwardly extended portion of the first pump shaft 310*a* at the second side may be used as the input shaft 220. Further, a second pump shaft 310*b*, which will be described later, may be configured to have an outwardly extended portion beyond an auxiliary pump case 520, and then the cooling fan 800 may be provided on the outwardly extended portion of the second pump shaft 310*b*.

The second hydraulic pump maim body 300*b* has substantially the same structure as that of the first hydraulic pump maim body 300*a*.

Consequently, detailed description of the second hydraulic pump maim body 300*b* will be properly omitted by replacing the end reference character "a" of the first hydraulic pump maim body 300*a* with "b".

The second pump shaft 310*b* is supported in a relatively rotatable manner about its axis by the port block 360, the second end-face portion 212 and the cover member 250 at a state where a downstream-side end portion in the direction of transmission is extended outwardly through the port block 360.

Further, an auxiliary pump main body 510, which will be described later, is supported on the outwardly extended portion of the second pump shaft 310*b*.

As illustrated in FIG. 2, the PTO shaft 610 is supported in a relatively rotatable manner about its axis by the first end-face portion 211 and the cover member 250 at a state where the downstream-side end portion in the direction of transmission is extended outwardly at the opposite side from the upstream-side of the input shaft 220.

The PTO clutch mechanism 600A includes a driving-side member 620 which is supported on the PTO shaft 610 in a relatively rotatable manner and is operatively connected to the input shaft 220, a driven-side member 630 which is supported on the PTO shaft 610 in a relatively non-rotatable manner, and friction plate unit 640 including driving-side friction plates supported by the driving-side member 620 in a relatively non-rotatable manner and driven-side friction plates supported by the driven-side member 630 in a relatively non-rotatable manner, wherein the friction plate unit 640 can be selectively engaged or disengaged with the effect of the hydraulic pressure to engage or disengage the power transmission from the input shaft 220 to the PTO shaft 610.

The transmission mechanism 280 is configured to be capable of transferring the rotational power of the input shaft 220 to the first pump shaft 310*a*, the second pump shaft 310*b* and the driving-side member 620, as illustrated in FIG. 2 and FIG. 4.

In this embodiment, the transmission mechanism 280 includes a first gear 281 supported on the input shaft 220 in a relatively non-rotatable manner, a second gear 282 supported on the second pump shaft 310*b* in a relatively non-rotatable manner with engaged with the first gear 281, and a third gear 283 provided on the driving-side member 620 such that it is engaged with the second gear 282.

As illustrated in FIG. 1, FIG. 2 and FIG. 4, the pump unit 100 includes, in addition to the aforementioned structures, the auxiliary pump main body 510 which is operatively driven by the input shaft 220, and an auxiliary pump case 520 connected to the outer surface of the port block 360 such that it surrounds the auxiliary pump main body 510.

In this embodiment, the auxiliary pump main body 510 is driven by the outwardly extended portion of the second pump shaft 310*b*, as previously described.

The pump unit 100 is configured to be capable of supplying fluid discharged from the auxiliary pump main body 510 to the pair of first hydraulic fluid lines 400*a* and the pair of second hydraulic fluid lines 400*b* as charge fluid, and also capable of supplying the discharged fluid to the PTO clutch mechanism 600A as operation fluid.

More specifically, as illustrated in FIG. 1, the pump unit 100 includes a suction line 550 which has a first end fluidly connected to a fluid reservoir (the internal space of the housing 200 in this embodiment) and a second end fluidly connected to a suction port of the auxiliary pump main body 510, a discharge line 560 which is fluidly connected to the discharge port of the auxiliary pump main body 510, a charge line 420 which supplies a part of the hydraulic fluid from the discharge line 560 to the pair of the first hydraulic fluid lines 400*a* and the pair of second hydraulic fluid lines 400*b* through a check valve 425, a PTO hydraulic fluid line 470 which supplies a part of the hydraulic fluid from the discharge line 560 to the PTO clutch mechanism 600A through a PTO relief valve 478, a pressure-reducing valve 530 which has a primary side fluidly connected to the discharge line 560, and a resistance valve 540 which is fluidly connected to the primary side of the pressure-reducing valve 530.

Further, the PTO hydraulic fluid line 470 and the charge line 420 are fluidly connected to the primary side and a secondary side of the pressure-reducing valve 530, respectively, to enable maintaining the hydraulic pressure in the charge line 420 constant regardless of whether or not the PTO clutch mechanism 600A is engaged or disengaged, thus preventing the malfunction of fluctuations in the operation torques of the output-adjusting members 350a and 350b of the first and second hydraulic pump main bodies 300a and 300b due to the change of the state of the hydraulic clutch mechanism 600A, which has been conventionally occurred.

Namely, in a conventional pump unit, the charge line and the PTO hydraulic fluid line are fluidly connected to the secondary side and the spring chamber of the pressure-reducing valve, respectively. This configuration induces the malfunction of a hydraulic pressure difference in the charge line between when the PTO clutch mechanism is engaged and when it is disengaged.

More specifically, when the PTO clutch mechanism is engaged, the PTO hydraulic fluid line is maintained at a predetermined hydraulic pressure defined by a PTO relief valve which is inserted into the PTO hydraulic fluid line, while when the PTO clutch mechanism is disengaged, the PTO hydraulic fluid line is at a natural pressure since it is drained to the fluid reservoir.

Consequently, in a conventional pump unit, when the PTO clutch mechanism is disengaged, the charge line is maintained at a predetermined hydraulic pressure with a hydraulic pressure setting spring of the pressure-reducing valve, while when the PTO clutch mechanism is engaged, the charge line is maintained at a pressure which is equal to the biasing force of the hydraulic pressure setting spring of the pressure-reducing valve plus the hydraulic pressure set by the PTO relief valve, since the hydraulic pressure of the PTO relief valve acts on the spring chamber of the pressure-reducing valve.

Such hydraulic pressure fluctuations in the charge line induce back pressures acting on the first piston unit 330a, thus causing fluctuations in the operation torques of the output-adjusting members in the hydraulic pump main bodies. Particularly, when the PTO clutch mechanism is engaged, the hydraulic pressure in the charge line rises, which causes an increase of the hydraulic pressure in the pair of hydraulic fluid lines, thus increasing the operation torques of the output-adjusting members. This offers discomfort to the operator and, for example, in a case where there is provided a neutral position returning mechanism for automatically returning the output-adjusting member to a neutral position in association with the release of the operating force, the returning to the neutral position will require a time or will not be completely attained in some cases due to the increase of the operation torque.

On the contrary, in this embodiment, as previously described, the charge line 420 is fluidly connected to the secondary side of the pressure-reducing valve 530 and the PTO hydraulic fluid line 470 is fluidly connected to the primary side of the pressure-reducing valve 530.

Consequently, even in the event of fluctuations in the hydraulic pressure in the PTO hydraulic fluid line 470 in association with the change of the state of the PTO clutch mechanism 600A, the charge line 420 is maintained at a predetermined hydraulic pressure defined by the hydraulic pressure setting spring of the pressure-reducing valve 530. Therefore, regardless of whether or not the PTO clutch mechanism 600A is actuated, the operation torques of the output-adjusting members 340a and 340b in the first and second hydraulic pressure pump main bodies 300a and 300b can be maintained constant, thus effectively preventing the aforementioned malfunction which has been occurred in conventional pump units.

Further, in this embodiment, as illustrated in FIG. 1, the PTO hydraulic fluid line 470 is fluidly connected to the primary side of the pressure-reducing valve 530 through an orifice 472, and also surplus fluid in the discharge line 560 is discharged to the outside of the system through the resistance valve 540.

Preferably, there may be provided a drain line 570 for fluidly communicating the secondary side of the resistance valve 540 to the fluid reservoir, and an oil cooler 575 may be inserted in the drain line 570 (see FIG. 1).

By providing these structures, it is possible to effectively prevent the temperature rise in stored fluid in the fluid reservoir.

More preferably, there may be provided an external hydraulic fluid extraction line 580 for extracting hydraulic fluid from the drain line 570 to outside. The external hydraulic fluid extraction line 580 is connected to, for example, a hydraulic actuator for lifting and lowering, with respect to the ground surface, a ground working machine (for example, a grass cutting mower machine) which is mounted on the working vehicle 1 and driven by the PTO shaft 610.

In this embodiment, the pump unit 100 includes the external hydraulic fluid extraction line 580 which has a first end fluidly connected to the drain line 570, an outside hydraulic fluid return line 581 which has a first end fluidly connected to the drain line 570, and a switching valve 582 for actuating the hydraulic actuator, the switching valve 582 being inserted in the drain line 570 between the connecting point 580T of the external hydraulic fluid extraction line 580 and the drain line 570 and the connecting point 581T of the outside hydraulic fluid return line 581 and the drain line 570.

Further, the outside hydraulic fluid return line 581 is connected to the drain line 570 at the upstream side of the oil cooler 575, thus enabling effectively preventing the temperature rise in the fluid in the fluid reservoir.

In this embodiment, the pump unit 100 includes an external hydraulic pressure relief valve 595 which has a primary side fluidly connected to the discharge line 560, the external hydraulic pressure relief valve 595 being for setting the hydraulic pressure in the external hydraulic fluid extraction line 580.

Preferably, as illustrated in FIG. 1, there may be provided a return line 590 which has a first end fluidly connected to the discharge line 560 and a second end fluidly connected to the suction line 550, and the external hydraulic pressure relief valve 595 may be inserted in this return line 590.

The concrete structures of the aforementioned respective hydraulic pressure lines will be described.

Figure 8:
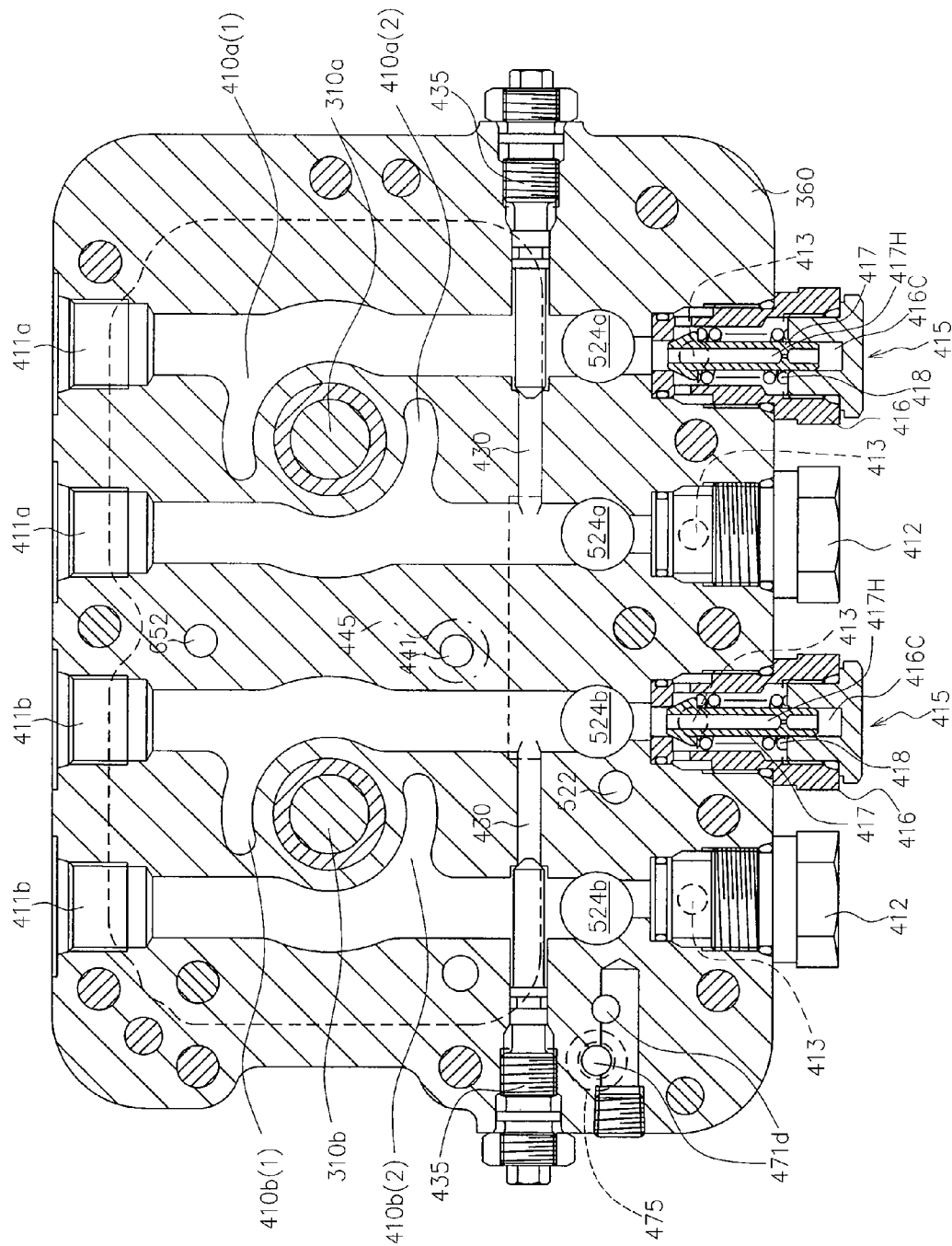
FIG. 8 is a cross-sectional view taken along a line VIII-VIII in FIG. 2.

As illustrated in FIG. 8, in the port block 360, there are formed a pair of first hydraulic fluid passages 410a forming a part of the pair of first hydraulic fluid lines 400a and a pair of second hydraulic fluid passages 410b forming a part of the pair of second hydraulic fluid lines 400b.

The pair of the first hydraulic fluid passages 410a and the pair of second hydraulic fluid passages 410b have substantially the same structure. Consequently, detailed description of the pair of the second hydraulic fluid passages 410b will be properly omitted by replacing the end reference character "a" of the pair of the first hydraulic fluid passages 410a with "b".

Each of the pair of the first hydraulic fluid passages 410a includes a kidney port serving as a fluid communication port to the corresponding first hydraulic pump main body 300a and a hydraulic fluid port 411*a* which is opened into the outer surface to serve as a fluid communication port to the first hydraulic motor unit 10*a*.

In this embodiment, as illustrated in FIG. 8, the pair of first hydraulic fluid passages 410*a* are formed in the port block such 360 that their first ends and second ends are opened to the outer surface, wherein the first ends form the hydraulic fluid ports 411*a* and the middle portions form the kidney ports.

Out of the pair of the first hydraulic fluid passages 410*a*, the forward-movement low-pressure side first hydraulic fluid passage 410*a*(2), which is brought into a low pressure during forward movement of the vehicle, is so configured that the second end is closed by a plug 412. On the other hand, the forward-movement high-pressure side first hydraulic fluid passage 410*a*(1), which is brought into a high pressure during forward movement of the vehicle, is so configured that the second end is sealed with a relief valve 415 which will be described later.

Specifically, out of the pair of first hydraulic fluid passages 410*a* and the pair of second hydraulic fluid passages 410*b*, the forward-movement high-pressure side first hydraulic fluid passage 410*a*(1) and the forward-movement high-pressure side second hydraulic fluid passage 410*b*(1), which are in high pressure state during forward movement, are provided with a relief mechanism which releases the hydraulic pressures in the forward-movement high-pressure side first hydraulic fluid passage 410*a*(1) and the forward-movement high-pressure side second hydraulic fluid passage 410*b*(1) to the forward-movement low-pressure side first hydraulic fluid passage 410*a*(2) and the forward-movement low-pressure side second hydraulic fluid passage 410*b*(2), respectively, when the hydraulic pressures in the forward-movement high-pressure side first hydraulic fluid passage 410*a*(1) and the forward-movement high-pressure side second hydraulic fluid passage 410*b*(1) exceed a predetermined hydraulic pressure.

In this embodiment, as illustrated in FIG. 4 and FIG. 8, the relief mechanism includes relief fluid passages 413 formed in the port block 360 so as to have first ends fluidly communicated with the second end of the forward-movement high-pressure side hydraulic fluid passage 410*a*(1) and 410*b*(1) and second ends opened into the surface abutting the housing main body 210, and the relief valves 415 mounted in the port block 360 so as to be positioned between the forward-movement high-pressure side hydraulic fluid passage 410*a*(1) and 410*b*(1) and the corresponding relief fluid passages 413.

Further, in this embodiment, in order to enable easily coping with specification changes, there are further formed, in the port block 360, relief fluid passages 413 corresponding to the forward-movement low-pressure hydraulic fluid passages 410*a*(2) and 410*b*(2). The plugs 412 are adapted to intercept between the relief fluid passages 413 and the corresponding forward-movement low-pressure side hydraulic fluid passages 410*a*(1) and 410*b*(2).

As illustrated in FIG. 8, the relief valves 415 include a valve housing 416 including a valve case having an opening communicated to the forward-movement high-pressure side hydraulic fluid passage 410*a*(1) or 410*b*(1) and a cap which is detachably mounted on the valve case, a valve main body 417 which is slidably accommodated within the valve housing 416, the valve main body 417 being capable of being positioned at a shutting-off position for closing the opening and a communicating position for causing the opening to be opened, and a relief spring 418 for biasing the valve main body 417 towards the shutting-off position.

The relief valves 415 act as follows. When the hydraulic pressures in the forward-movement high-pressure side hydraulic fluid passages 410*a*(1) and 410*b*(1) are equal to or less than a predetermined hydraulic pressure defined by the biasing force of the relief springs 418, the relief valves 415 intercept between the forward-movement high-pressure side hydraulic fluid passages 410*a*(1) and 410*b*(1) and the relief fluid passages 413. Also, when the hydraulic pressures in the forward-movement high-pressure side hydraulic fluid passages 410*a*(1) and 410*b*(1) exceed the predetermined hydraulic pressure, the relief valves 415 cause the forward-movement high-pressure side 410*a*(1) and 410*b*(1) to be communicated with the relief fluid passages 413. Consequently, in the event that the hydraulic motor units 10*a* and 10*b* temporarily become incapable of rotating during forward movement, it is possible to prevent the occurrence of abnormal high pressures in the forward-movement high-pressure side hydraulic fluid passages 410*a*(1) and 410*b*(1) to protect the first and second hydraulic pump main bodies 300*a* and 300*b*.

More specifically, as illustrated in FIG. 8, the valve housing 416 may be provided with a pressure maintaining chamber 416C which slidably supports the base end portion of the valve main body 417, the pressure maintaining chamber 416C being separated from the relief fluid passage 413. Further, the valve main body 417 may be provided with an axial hole 417H between the tip end portion and the base end portion thereof, the axial hole 417H having an orifice.

By providing these structures, it is possible to slow the movement of the valve main body 417 from the shutting-off position to the communicating position and the movement thereof from the communicating position to the shutting-off position, thereby effectively preventing damping and/or chattering.

Further, while in this embodiment the relief valves 415 are inserted only between the forward-movement high-pressure side hydraulic fluid passages 410*a*(1) and 410*b*(1) and the corresponding relief fluid passages 413, and the plugs 412 are employed to intercept between the forward-movement low-pressure side hydraulic fluid passages 410*a*(2) and 410*b*(2) and the corresponding relief fluid passages 413 as previously described, it is possible to mount the relief valves 415 between the forward-movement low-pressure side hydraulic fluid passages 410*a*(2) and 410*b*(2) and the corresponding relief fluid passages 413. With the configuration, even in the event that the hydraulic pressure motor units 10*a* and 10*b* temporarily become incapable of rotating during rearward movement, it is possible to prevent the occurrence of abnormal high pressures in the forward-movement low-pressure side hydraulic fluid passages 410*a*(2) and 410*b*(2) to protect the first and second hydraulic pump main bodies 300*a* and 300*b*.

Figure 9:
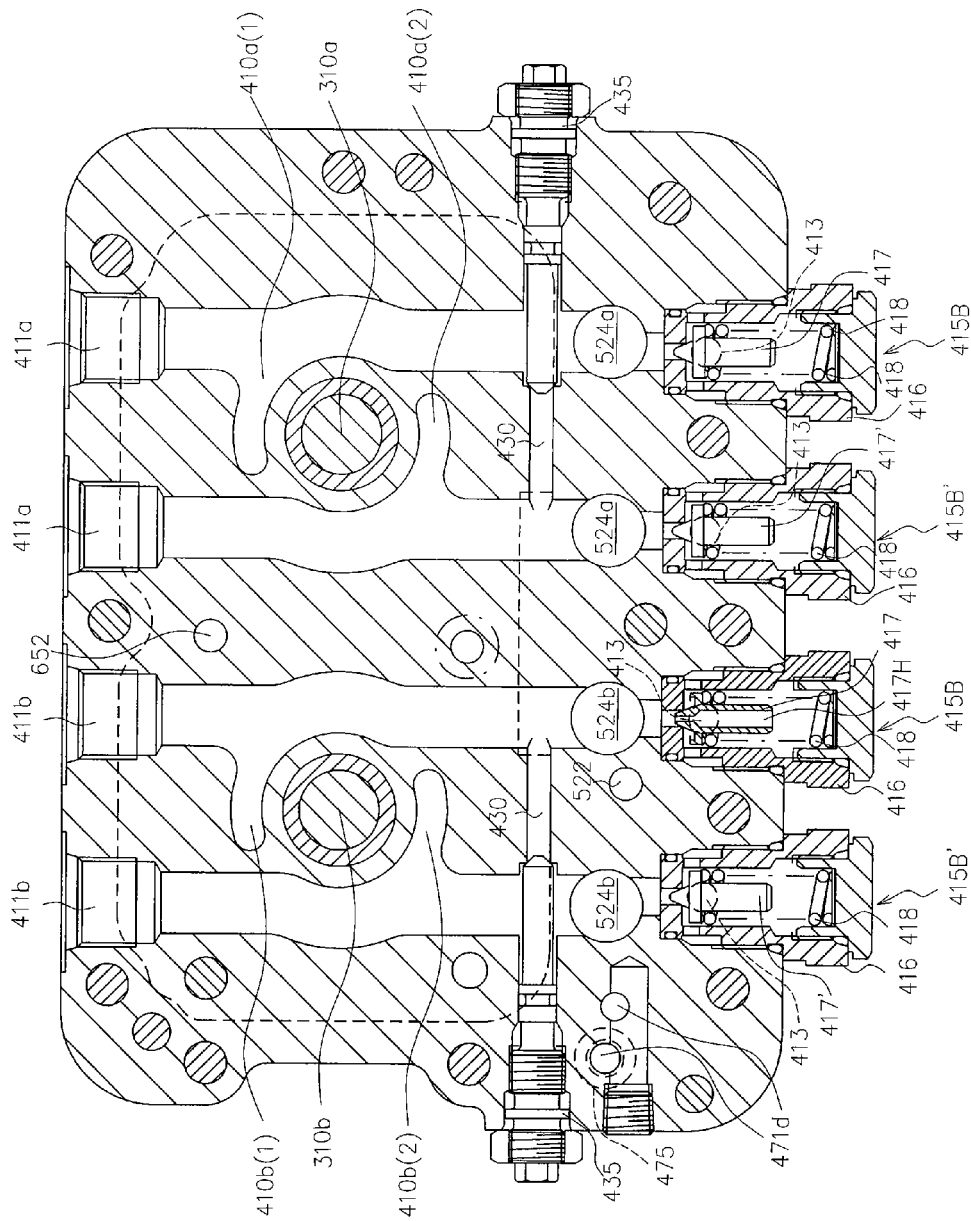
FIG. 9 is a cross-sectional view of a port block in a modified pump unit of the present invention.

Further, while in this embodiment, the relief valves 415 having the pressure maintaining chambers 416C are employed as previously described, it is possible to insert a relief valve 415B having no such a pressure maintaining chamber 416C between the forward-movement high-pressure side hydraulic fluid passage 410*a*(1) and the relief fluid passage 413 as illustrated in FIG. 9.

This modified configuration illustrated in FIG. 9 can slow the movement of the valve main body 417 between the shutting-off position and the communicating position, while reducing the manufacturing cost.

In the configuration illustrated in FIG. 9, relief valves 415B' are further provided in the forward-movement low-pressure side hydraulic fluid passages 410*a*(2) and 410*b*(2).

The relief valve main bodies 417' of the relief valves 415B' include no axial hole 417H with an orifice.

Further, as illustrated in FIG. 8, there are formed, in the port block 360, a pair of bypass fluid passages 430 for communicating the pair of first hydraulic fluid passages 410a to each other and for communicating the pair of second hydraulic fluid passages 410b to each other.

Further, switching valves 436 for opening/closing the pair of bypass fluid passages 430 are mounted in the port block 360.

By providing these bypass fluid passages 430 and the switching valves 435, it is possible to prevent the occurrence of hydraulic pressure differences between the pair of first hydraulic fluid lines 400a and between the pair of second hydraulic fluid lines 400b resulting in resistances, when the vehicle is forcibly towed.

Figure 10:
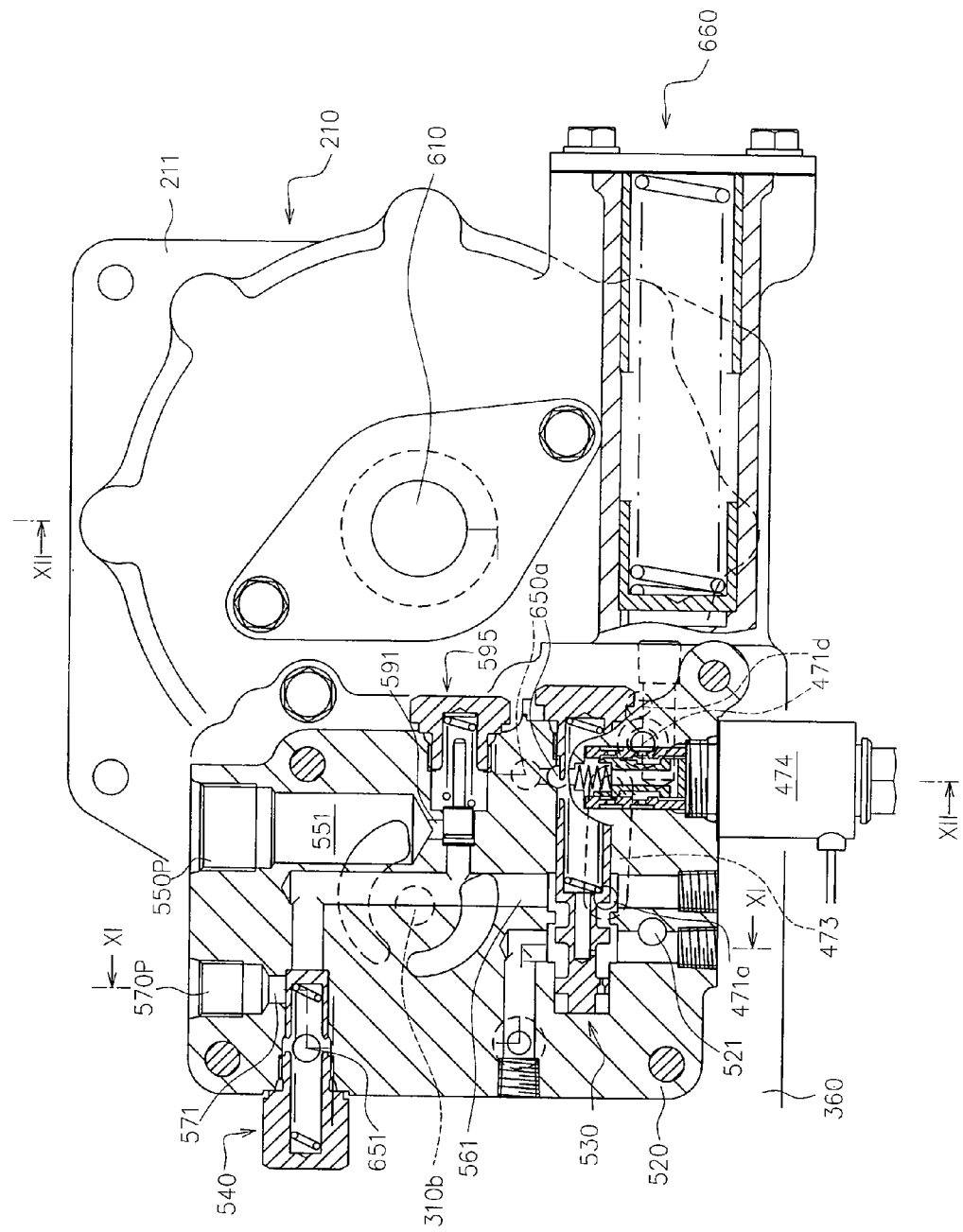
FIG. 10 is a cross-sectional view of an auxiliary pump case, taken along a line X-X in FIG. 2.

FIG. 10 illustrates a cross-sectional view of the auxiliary pump case 520 taken along a line X-X in FIG. 2. In FIG. 10, there are illustrated different cross sections.

Figure 11:
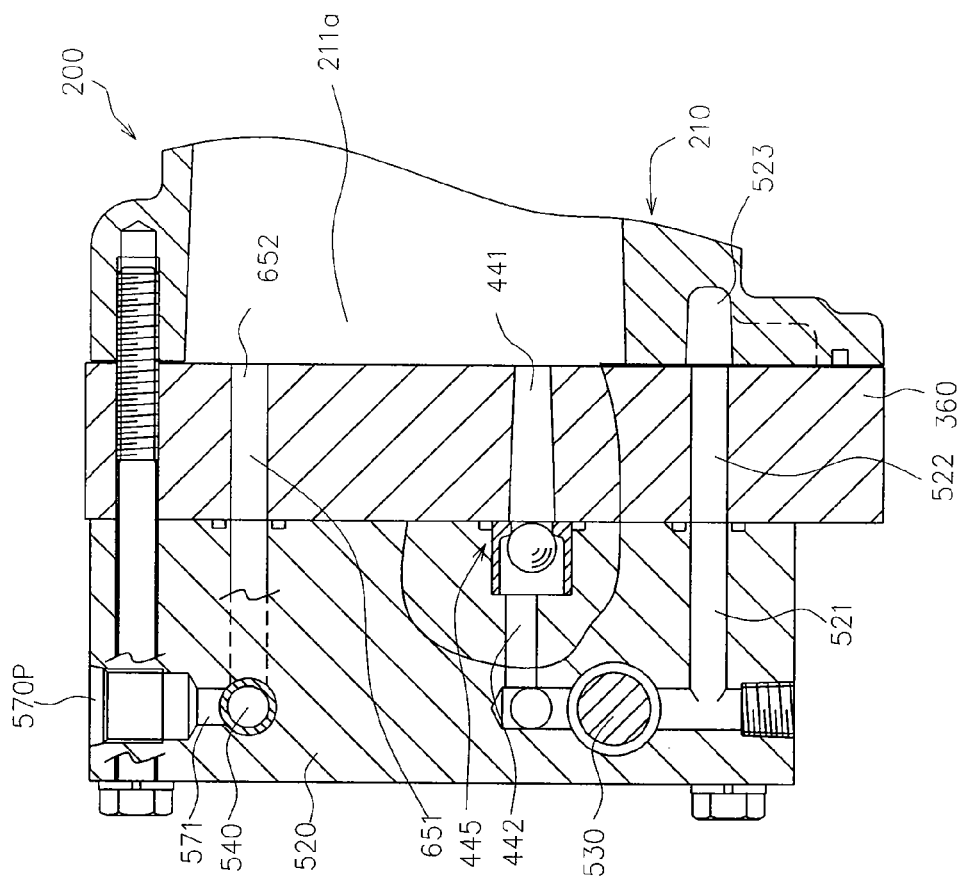
FIG. 11 is a cross-sectional view taken along a line XI-XI in FIG. 10.

FIG. 11 illustrates a cross-sectional view taken along a line XI-XI in FIG. 10.

As illustrated in FIG. 1, FIG. 2 and FIG. 10, in the auxiliary pump case 520, there is formed a suction fluid passage 551 which has a first end opened to the outer surface to form a suction port 550P and a second end fluidly connected to the suction port of the auxiliary pump main body 510.

The suction port 550P is fluidly connected to an external tank 900, which is placed separately from the housing 300, through an external conduit 552 having a filter 553 inserted therein (see FIG. 1).

In this embodiment, the external conduit 552 and the suction fluid passage 551 form the suction line 550.

The external tank 900 is connected to the inside space of the housing 200 such that fluid can be freely communicated therebetween via a communication port 200P formed on the wall 213 of the housing 200 (see FIG. 1 and FIG. 6) and an external conduit 910 connected to the communication port 200P. Namely, in this embodiment, the inside space of the housing 200 and the external tank 900 form the fluid reservoir.

Further, as illustrated in FIG. 1, FIG. 4 and FIG. 10, in the auxiliary pump case 520, there are formed a suction fluid passage 561 which has a first end fluidly connected to the discharge port of the auxiliary pump main body 510 to form the discharge line 560, a return fluid passage 591 (see FIG. 10) which has a first end fluidly connected to the discharge fluid passage 561 and a second end fluidly connected to the suction fluid passage 551, and the external hydraulic pressure relief valve 595 (see FIG. 10) inserted in the return fluid passage 591.

Further, as illustrated in FIG. 10, the auxiliary pump case 520 incorporates the pressure-reducing valve 530 such that the primary side thereof is fluidly connected to the discharge fluid passage 561 and also incorporates the resistance valve 540 such that it is fluidly connected to the primary side of the pressure-reducing valve 530.

Further, in the auxiliary pump case 520, there is formed an auxiliary-pump-case side common charge fluid passage 521 which has a first end fluidly connected to the secondary side of the pressure-reducing valve 530 and has a second end opened to the surface abutting the port block 360, wherein the secondary-pump-case side common charge fluid passage 521 forms a part of the charge line 520 (see FIG. 10 and FIG. 11).

More specifically, in this embodiment, the charge line 520 includes the auxiliary-pump-case side common charge fluid passage 521 formed in the auxiliary pump case 520 (see FIG. 10 and FIG. 11), a port block side charge fluid passage 522 which is formed in the port block 360 such that it has a first end fluidly connected to the auxiliary-pump-case side common charge fluid passage 521 and a second end opened to the surface abutting the first end-face portion 211 of the housing main body 210 (see FIG. 5, FIG. 8 and FIG. 11), a charge fluid groove 523 formed in the outer surface (the surface abutting the port block 360) of the first end-face portion 211 of the housing main body 210 such that it is fluidly connected to the port block side common charge fluid passage 522 (see FIG. 5 and FIG. 11), a pair of first charge fluid passages 524a formed in the port block 360 such that they have first ends fluidly connected to the charge fluid groove 523 and second ends fluidly connected to the pair of first hydraulic fluid passages 410a (see FIG. 5 and FIG. 8), a pair of second charge fluid passages 524b formed in the port block 360 such that they have first ends fluidly connected to the charge fluid groove 523 and second ends fluidly connected to the pair of second hydraulic fluid passages 410b (see FIG. 5 and FIG. 8), and check valves 425 inserted in the pair of first charge fluid passages 524a and the pair of second charge fluid passages 524b for allowing fluid to flow from the corresponding charge fluid passages 524a and 524b into the corresponding hydraulic fluid passages 410a and 410b and for preventing the reverse flow thereof (see FIG. 1 and FIG. 4).

In this embodiment, between the forward-movement low-pressure side hydraulic fluid passages 410a(2), 410b(2) and the charge fluid passages 524b, orifices are respectively provided in parallel with the check valve 425 to prevent the reduction of the transmission efficiently during forward movement, while increasing the neutral ranges of the first HST and the second HST (see FIG. 1).

Figure 14:
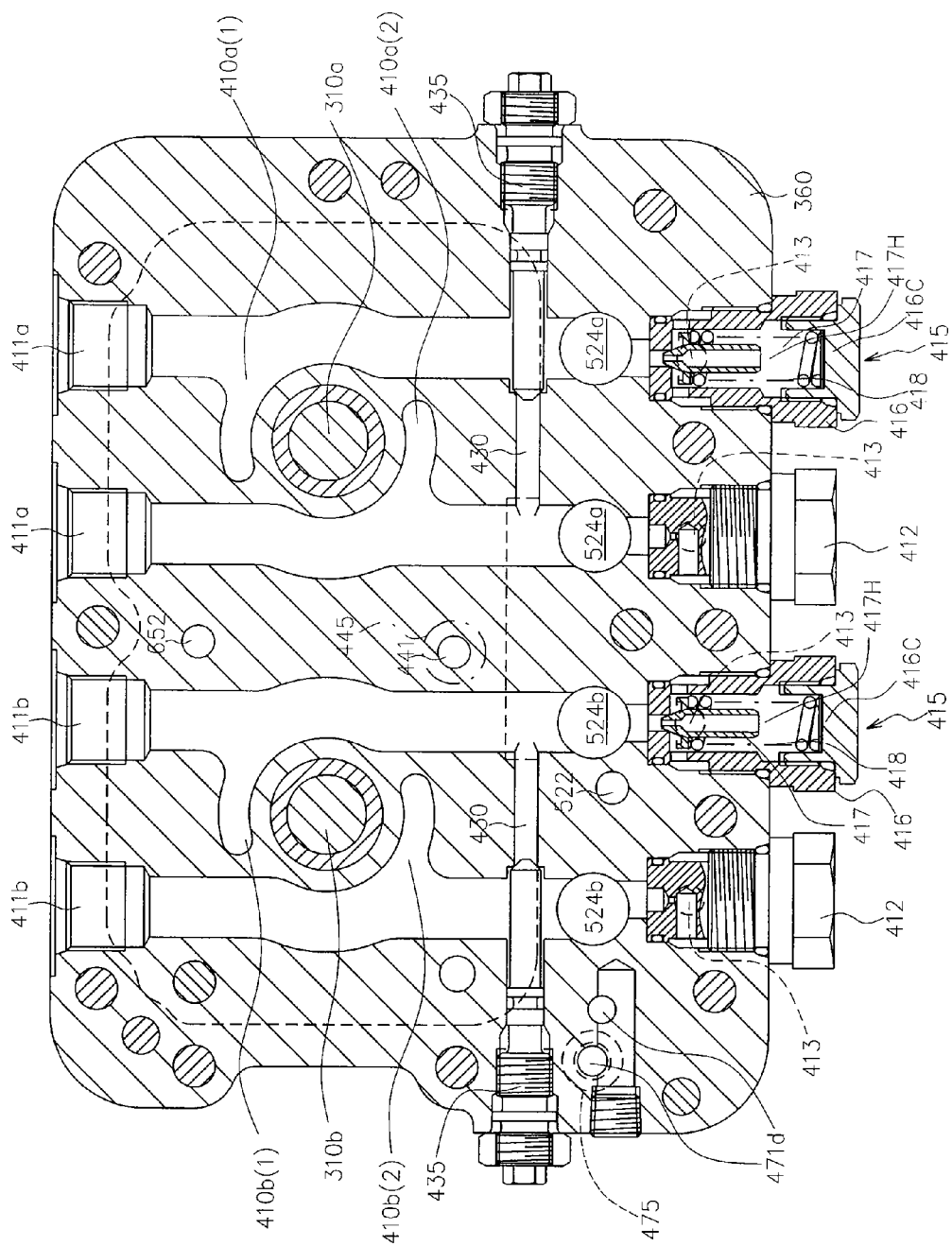
FIG. 14 is a cross-sectional view of a port block in a modified pump unit of the present invention.

These orifices may be provided either in the valve cases for the rearward-side check valves 425 or in the plugs 412 as illustrated in FIG. 14. The latter configuration enables utilizing common valve cases for both the forward and rearward-side check valves 425 and also enables eliminating assembly errors.

Figure 5:
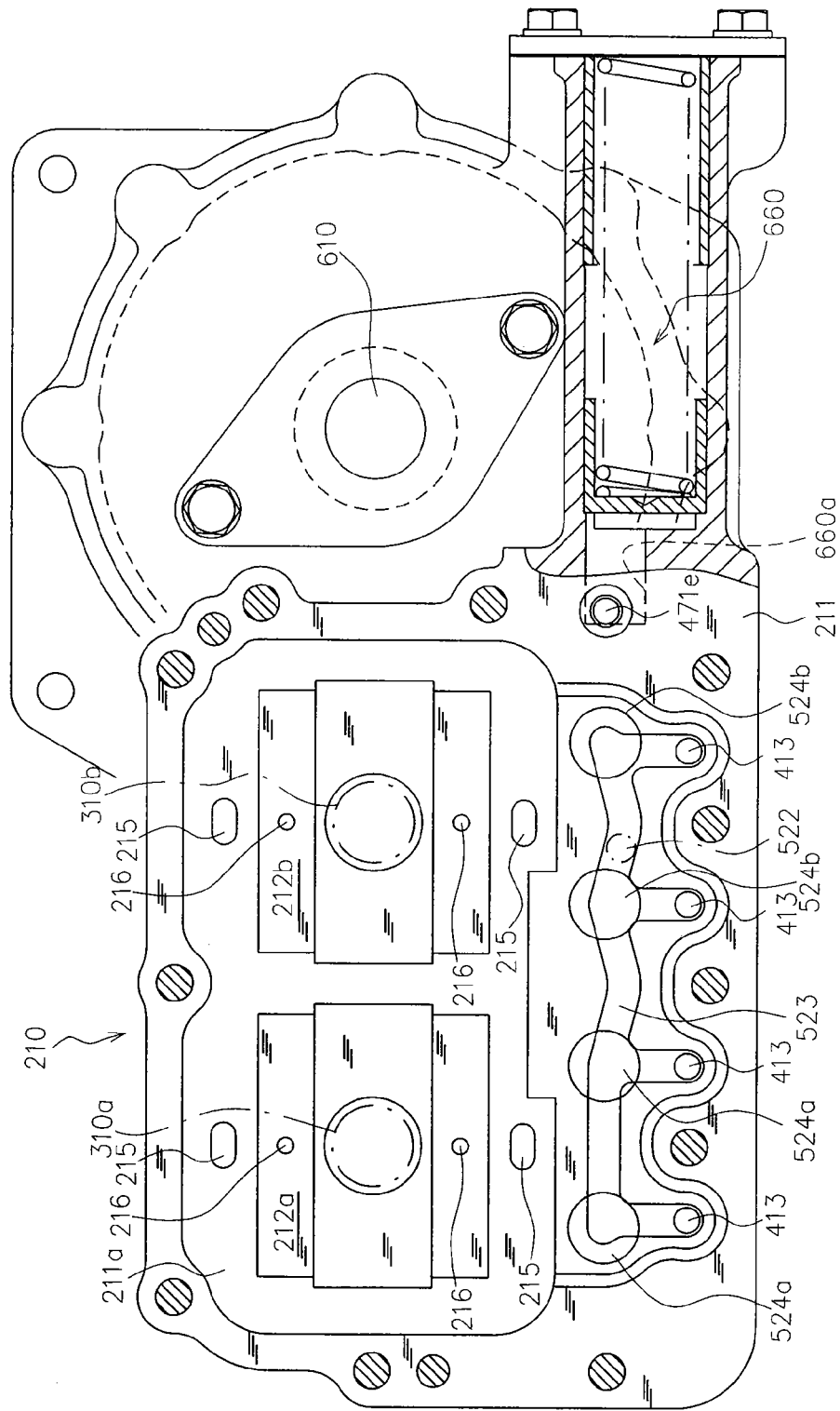
FIG. 5 is a cross-sectional view taken along a line V-V in FIG. 2.
Figure 6:
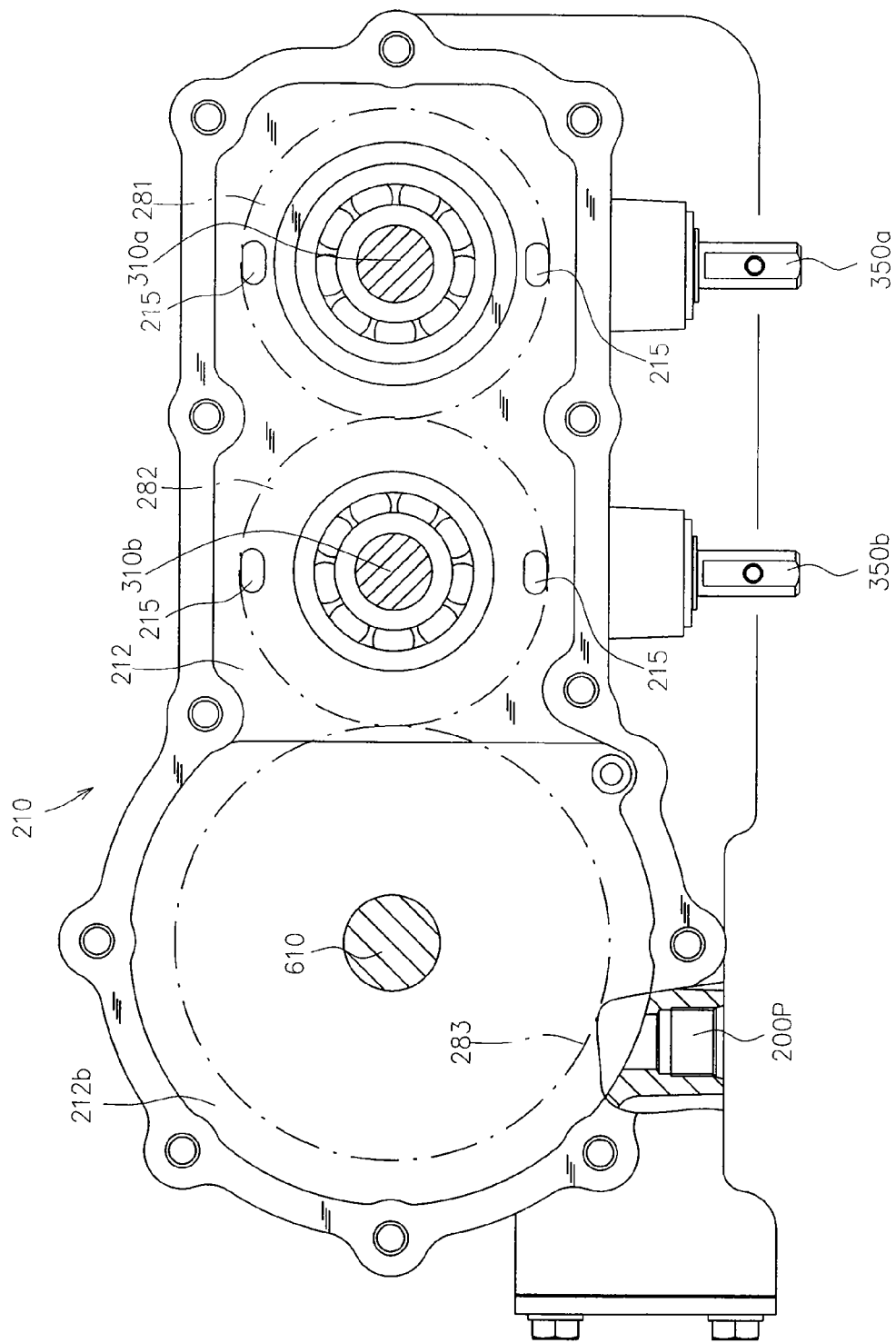
FIG. 6 is a cross-sectional view taken along a line VI-VI in FIG. 2.

Further, in this embodiment, the second end portions of the relief fluid passages 413 are opened into the charge fluid groove 543 (see FIG. 4 and FIG. 5).

Namely, when the pressures in the forward-movement high-pressure side hydraulic fluid passages 410a(1) and 410b(b) become abnormally high, the hydraulic fluid flows from the forward-movement high-pressure side hydraulic fluid passages 410a(1) and 410b(b) into the forward-movement low-pressure side hydraulic fluid passages 410a(2) and 410b(2) through the relief fluid passages 413, the charge fluid groove 523 and the charge fluid passages 524.

Further, as illustrated in FIG. 1, in addition to the aforementioned hydraulic lines, the pump unit 100 according to this embodiment includes a self-suction line 440 which has a first end fluidly connected to the aforementioned fluid reservoir (the internal space of the housing 200) and a second end fluidly connected to the charge line 420, wherein there is inserted therein a check valve 445 which allows fluid to flow from the fluid reservoir to the charge line 420 while preventing the reverse flow thereof.

In the event that any one of the pair of first hydraulic fluid lines 400a or any one of second hydraulic fluid lines 400b is brought into a negative pressure during standstill of the auxiliary pump main body 510, the self-suction line 440 sucks fluid from the fluid reservoir into the hydraulic fluid line at such a negative pressure.

Namely, for example, when the working vehicle is parked at a slope or the like and the engine 40 is stopped with the HST being at a neutral state, a rotational force is applied to the motor shaft which is operatively connected to the driving wheel 40, thereby the hydraulic motor units 10a and 10b attempting to perform pumping action.

At this time, when the pair of first hydraulic fluid lines 400a and the pair of second hydraulic fluid line 400b are filled with hydraulic fluid, braking forces are acted on the hydraulic motor units 10a and 10b through the hydraulic fluid, while the pressures in one of the pair of first hydraulic fluid lines 400a and one of the pair of second hydraulic fluid lines 400b are raised to a high pressure with the pumping action of these hydraulic motor units 10a and 10b, thus causing leakage of hydraulic fluid from the high-pressure hydraulic fluid line.

In the event of the occurrence of hydraulic fluid leakage, the fluid is circulated from the negative-pressure side hydraulic fluid line to the high-pressure side hydraulic fluid line, in the pair of first hydraulic fluid lines 400a and the pair of second hydraulic fluid lines 400b, thus facilitating hydraulic fluid leakage from the high-pressure side hydraulic fluid line. Finally, the hydraulic fluid is removed from the pair of first hydraulic fluid lines 400a and the pair of second hydraulic fluid lines 400b, which causes the driving wheels to freely rotate and thus causes the vehicle to start descending the slope (free wheel phenomenon).

In view of this point, the pump unit according to this embodiment includes the self-suction line 440 so that, in the event that any one of the pair of first hydraulic fluid lines 400a or any one of second hydraulic fluid line 400b is brought into a negative-pressure, fluid is supplied from the fluid reservoir (the inside space of the housing 200 in the illustrated embodiment) to the negative-pressure side hydraulic fluid line, thus effectively preventing the aforementioned free wheel phenomenon.

More specifically, as illustrated in FIG. 11, the self-suction line 440 includes a first self-suction fluid passage 441 formed in the port block 360 such that it has a first end opened to the inside space of the housing 200 and a second end opened to the surface abutting the auxiliary pump case 520, and a second self-suction fluid passage 442 formed in the auxiliary pump case 520 such that it has a first end opened to the surface abutting the port block 360 to be fluidly connected to the first self-suction fluid passage 441 and a second end communicated with the auxiliary-pump-case side common charge fluid passage 521.

Further, the check valve 445 is mounted on the auxiliary pump case 520 so as to allow fluid to flow only in the direction from the first self-section fluid passage 441 to the second self-suction fluid passage 442 through the surface abutting (contacting) the port block 360.

Figure 12:
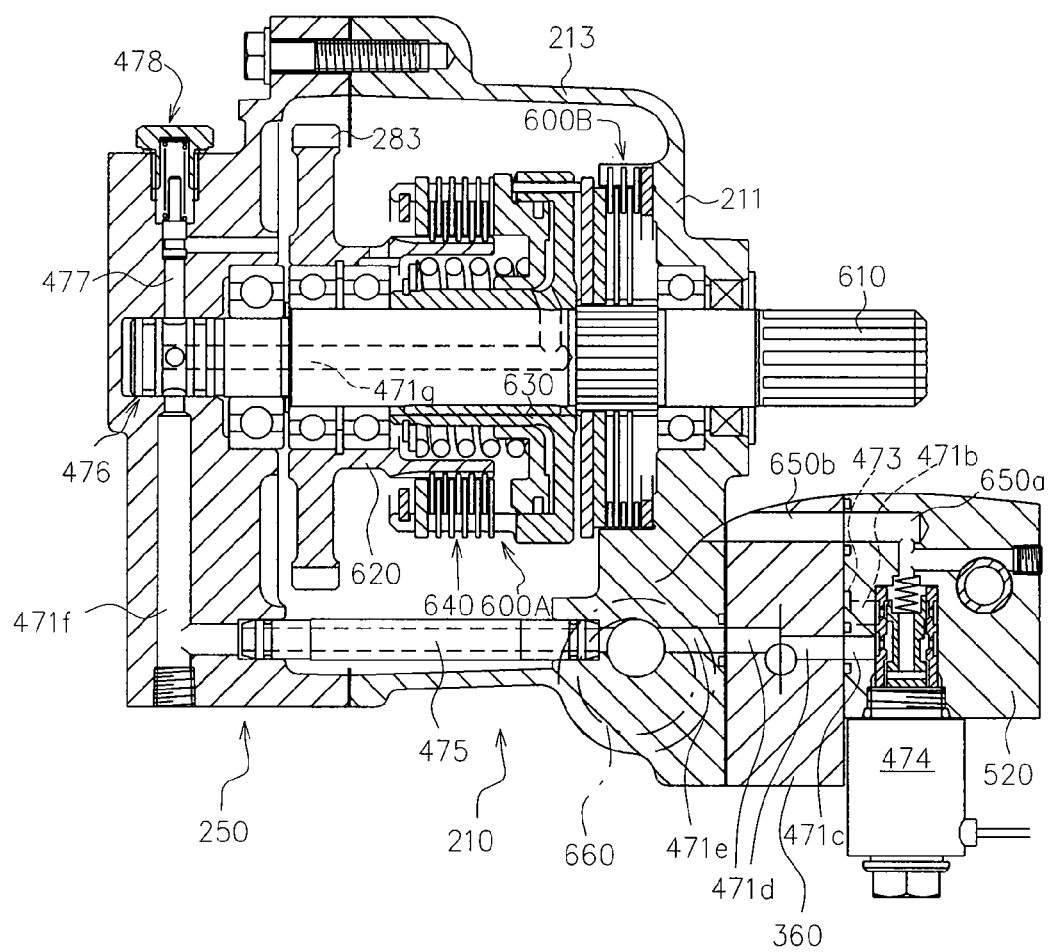
FIG. 12 is a cross-sectional view taken along a line XII-XII in FIG. 10.

FIG. 12 is a cross-sectional view taken along a line XII-XII in FIG. 10.

Further, as illustrated in FIG. 4, FIG. 10 and FIG. 12, the auxiliary pump case 520 is provided with a first PTO hydraulic fluid passage 471a which has a first end fluidly connected to the primary side of the pressure-reducing valve 530 and a second end opened to the surface abutting the port block 360, an orifice 472 inserted in the first PTO hydraulic fluid path 471, a PTO hydraulic fluid groove 473 which is formed at the surface abutting the port block 360 so as to be fluidly connected to the first PTO hydraulic fluid passage, a solenoid valve 474, a second PTO hydraulic fluid passage 471b which has a first end fluidly connected to the PTO hydraulic fluid groove 473 and a second end fluidly connected to the primary side of the solenoid valve 474, a third PTO hydraulic fluid passage 471c which has a first end fluidly connected to the secondary side of the solenoid valve 474 and a second end opened to the surface abutting the port block 360 at a position spaced apart from the PTO hydraulic fluid groove 473, and a PTO drain fluid passage 650a which has a first end fluidly connected to the drain port of the solenoid valve 474 and a second end opened to the surface abutting the port block 360.

Further, the first PTO hydraulic fluid passage 471a, the throttle 472, the PTO hydraulic fluid groove 473, the solenoid valve 474, the second PTO hydraulic fluid passage 471b and the third PTO hydraulic fluid passage 471c form a part of the PTO hydraulic fluid line 470 (see FIG. 1).

The PTO drain fluid passage 650a is opened into the internal space of the housing 200 via a PTO drain fluid passage 650b formed in the port block 360 (see FIG. 12).

Figure 7:
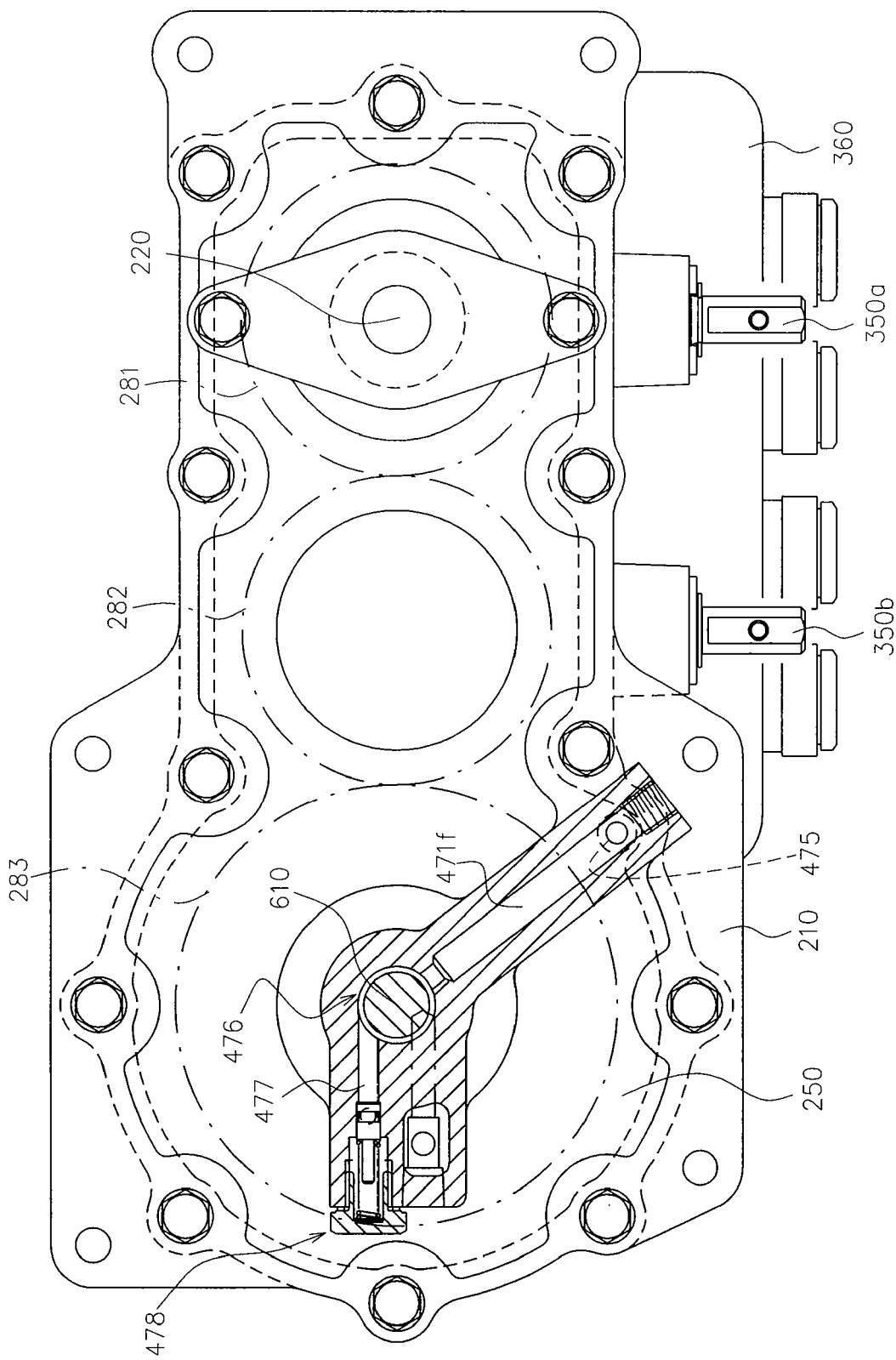
FIG. 7 is a cross-sectional view taken along a line VII-VII in FIG. 2.

As illustrated in FIG. 7, FIG. 10 and FIG. 12, the PTO hydraulic fluid line 470 further includes a fourth PTO hydraulic fluid passage 471d formed in the port block 360 such that it has a first end fluidly connected to the downstream end portion of the third PTO hydraulic fluid passage 471c and a second end opened to the surface abutting the first end-face portion 211 of the housing main body 210, a fifth PTO hydraulic fluid passage 471e formed in the first end-face portion 211 such that it has a first end fluidly connected to the fourth PTO hydraulic fluid passage 471d and a second end opened to the internal space of the housing 200, and an accumulator 660 incorporated in the first end-face portion 211 such that it is inserted in the fifth PTO hydraulic fluid passage 471e, the accumulator 660 including an inlet port 660a for fluidly connecting a hydraulic chamber of the accumulator 660 to the fifth PTO hydraulic fluid passage 471e. Further, the PTO hydraulic fluid line 470 includes a PTO internal conduit 475 provided within the internal space of the housing 200 such that it has a first end fluidly connected to the downstream end portion of the fifth PTO hydraulic fluid passage 471e and a second portion reaching the inner surface of the cover member 250, a sixth PTO hydraulic fluid passage 471f formed in the cover member 250 such that it has a first end fluidly connected to the downstream end portion of the PTO internal conduit 475 and a second end opened to an inner surface of a bearing hole which supports the PTO shaft 610 in a bearing manner, and a seventh PTO hydraulic fluid passage 471g formed in the PTO shaft 610 such that it has a first end opened to the outer surface within the bearing hole and a second end opened to the PTO clutch mechanism 600A. Further, the PTO hydraulic fluid line 470 includes a rotary joint 476 formed between the inner surface of the bearing hole and the outer surface of the PTO shaft 610 such that it fluidly connects the sixth PTO hydraulic fluid passage 471f to the seventh PTO hydraulic fluid passage 471f, a PTO relief fluid passage 477 formed in the cover member 250 such that it has a first end fluidly connected to the rotary joint 476 and a second end opened to the internal space of the housing 200, and the PTO relief valve 478 inserted in the PTO relief fluid passage 477.

As previously described, in the pump unit 100 according to this embodiment, the accumulator 660 for gradually raising the hydraulic pressure in the PTO hydraulic fluid line 470 to a predetermined hydraulic pressure defined by the PTO relief valve 478 is incorporated in the housing 200 which accommodates the first hydraulic pump main body 300a, the second hydraulic pump main body 300b and the PTO clutch mechanism 600A. This facilitates the efficiency of the piping operation, the prevention of leakage of hydraulic fluid and the reduction of the size of the entire apparatus.

More specifically, as illustrated in FIG. 12, in this embodiment, the portion of the first end-face portion 211 other then the portion for supporting the PTO shaft 610 (above the portion for supporting the PTO shaft 610, in this embodiment) is made to be a thick portion.

Further, as illustrated in FIG. 5 and FIG. 10, the accumulator 660 is incorporated within the thick portion of the first end-face portion 211 such that its axis is substantially orthogonal to the rotation axes of the first and second hydraulic pump main bodies 300a and 300b.

Figure 13:
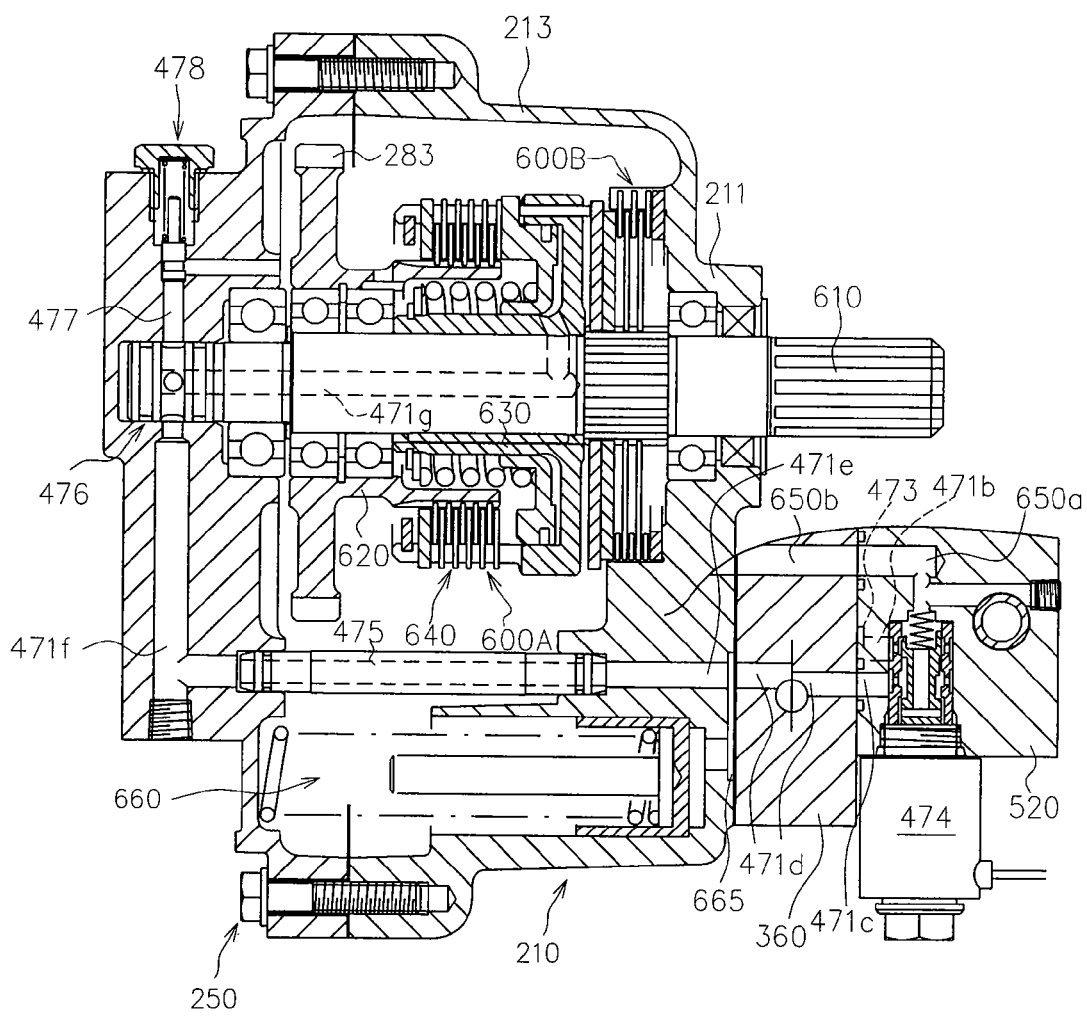
FIG. 13 is a cross-sectional view of a modified pump unit of the present invention.

Instead thereof, as illustrated in FIG. 13, the accumulator 660 may be incorporated within the wall 213 of the housing main body 210 such that its axis is substantially parallel to the rotation axes of the first and second hydraulic pump main bodies 300a and 300b.

Namely, in the embodiment illustrated in FIG. 13, the accumulator 660 is incorporated within the wall 213, and there is formed a fluid groove 665 which fluidly communicates the forth PTO hydraulic fluid passage 471d or the fifth PTO hydraulic fluid passage 471e to the inlet port 660a of the accumulator 660, at the surface of the first end-face portion 211 abutting the port block 360.

This configuration facilitates the efficiency of the piping operation, the prevention of leakage of hydraulic fluid and the reduction of the size of the entire apparatus, similarly to this embodiment.

Further, as illustrated in FIG. 4, FIG. 10 and FIG. 11, the auxiliary pump case 520 is provided with the resistance valve 540 which is fluidly connected to the primary side of the pressure-reducing valve 530, a drain fluid passage 571 which has a first end fluidly connected to the secondary side of the resistance valve 540 and has a second end opened to the outer surface to form an outlet port 570Pout, and a first return fluid passage 651 which has a first end fluidly connected to a spring chamber of the resistance valve 540 and a second end opened to the surface abutting the port block 360.

Further, as illustrated in FIG. 11, the first return fluid passage 651 is opened into the fluid reservoir (the internal space of the housing 200 in this embodiment) through a second return fluid passage 652 formed in the port block 360.

The drain fluid passage 571 forms a part of the drain line 570.

More specifically, as illustrated in FIG. 1, in addition to the drain fluid passage 571, the drain line 570 includes a drain external conduit 572 which has a first end fluidly connected to the drain fluid passage 571 via the drain port 570P and a second end fluidly connected to the internal space of the housing 200 via an inlet port 570Pin (see FIG. 2) formed in the wall 213 of the housing main body 210.

In this embodiment, the external hydraulic fluid extraction line 580 and the outside hydraulic fluid return line 581 are connected to the drain external conduit 572.

Further, the oil cooler 575 is inserted in the drain external conduit 572.

Further, while in this embodiment there has been described the dual-type pump unit including the first and second hydraulic pump main bodies 300a and 300b accommodated within the housing 200, it is obvious that the present invention is not limited to this embodiment.

Namely, the present invention may be applied to a single-type pump unit including a single hydraulic pump main body within a housing and also may be applied to a hydrostatic transmission including a hydraulic pump main body and a hydraulic motor main body accommodated within a housing.

Embodiment 2

Hereinafter, another preferred embodiment according to the present invention will be described with reference to the attached drawings.

A pump unit 100B according to this embodiment is applied to a vehicle such that it forms a part of the travel-system transmission path. The pump unit is configured to be capable of transmitting a rotational power from a driving power source that is operatively connected thereto to first and second hydraulic motor units 10a and 10b which drive left and right driving wheels 50 through a pair of first hydraulic fluid lines 400a and a pair of second hydraulic fluid lines 400b.

The components identical or corresponding to those in the aforementioned first embodiment will be designated by the identical reference characters and description thereof will be properly omitted.

Figure 15:
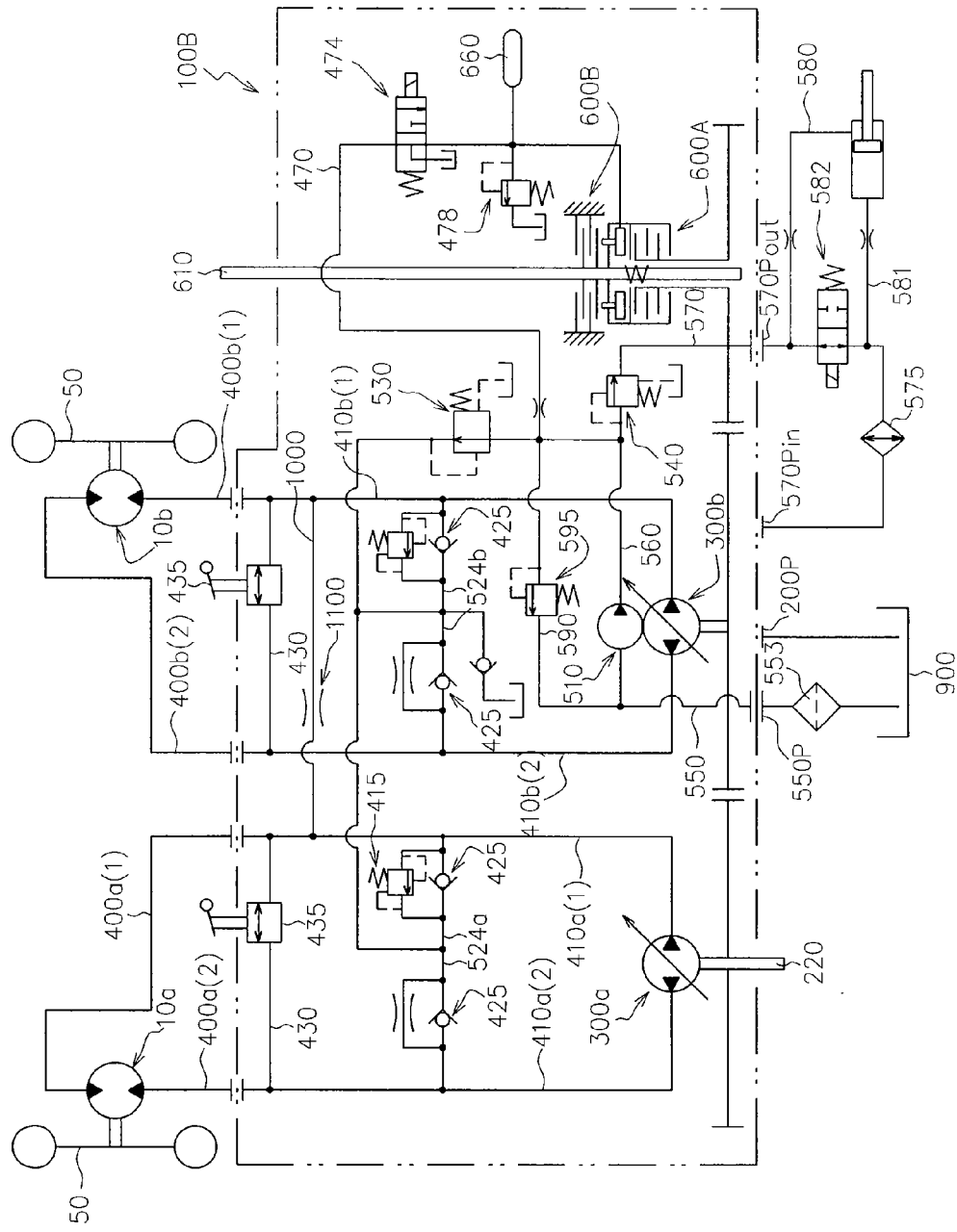
FIG. 15 is a hydraulic circuit diagram of a vehicle to which a pump unit according to a second embodiment of the present invention.

FIG. 15 illustrates a hydraulic circuit diagram of a vehicle to which the pump unit 100B according to this embodiment is applied.

More specifically, the pump unit 100B includes the input shaft 220 which is operatively connected to the driving power source, the first and second hydraulic pump main bodies 300a and 300b which are operatively driven by the input shaft 220 and are fluidly connected to the first and second hydraulic motor units 10a and 10b through the pair of first hydraulic fluid lines 400a and the pair of second hydraulic fluid lines 400b, a housing main body (not shown) accommodating the first and second hydraulic pump main bodies 300a and 300b, and a port block 360B (see FIG. 16) which abuts and supports the first and second hydraulic pump main bodies 300a and 300b and defines the accommodating space for the first and second hydraulic pump main bodies 300a and 300b, in cooperation with the housing main body.

More specifically, the first hydraulic pump main body 300a forms a first HST in cooperation with the first hydraulic motor main body in the first hydraulic motor unit 10a while the second hydraulic pump main body 300b forms a second HST in cooperation with the second hydraulic motor main body in the second hydraulic motor unit 10b.

Namely, at least one of the first hydraulic pump main body 300a and the first hydraulic motor main body is of a variable displacement type which varies the suction/discharge rate on the basis of the operation of the output-adjusting member.

Similarly, at least one of the second hydraulic pump main body 300b and the second hydraulic motor main body is of a variable displacement type which varies the suction/discharge rate on the basis of the operation of the output-adjusting member.

Through the operation of the respective output-adjusting members in the first HST and the second HST, the left and right driving wheels can be individually driven in a variable-speed manner.

As illustrated in FIG. 15, the pump unit 100B further includes a communication line 100 having an orifice 1100 inserted therein, the communication line 100 being for communicating the forward-movement high-pressure side first hydraulic fluid line 400a(1) out of the pair of the first hydraulic fluid lines 400a to the forward-movement high-pressure side second hydraulic fluid line 400b(1) out of the pair of second hydraulic fluid lines 400b, wherein the pressures in the forward-movement high-pressure side first hydraulic fluid line 400a(1) and the forward-movement high-pressure side second hydraulic fluid line 400b(1) are raised to higher pressures during forward movement. With this configuration, it is possible to effectively maintain the independent transmissions of the first and second HSTs while effectively preventing or reducing the occurrence of wandering phenomenon that the vehicle meanders even though the respective output-adjusting members of the first and second HSTs are operated such that the first and second HSTs are brought into the same output state.

Namely, by providing the communication line 1000 with the orifice, it is possible to maintain the hydraulic pressure difference between the forward-movement high-pressure side first hydraulic fluid line 400a(1) and the forward-movement high-pressure side second hydraulic fluid line 400b(1)

when the first and second HSTs are brought into different output states for rotating the vehicle, and also it is possible to prevent or reduce the occurrence of hydraulic pressure differences between the forward-movement high-pressure side first hydraulic fluid line 400*a*(1) and the forward-movement high-pressure side second hydraulic fluid line 400*b*(1) when the first and second HSTs are brought into the same output state for moving the vehicle straightly.

In this embodiment, the communication line 1000 includes a communication fluid passage 1010 formed in the port block 360B.

Figure 16:
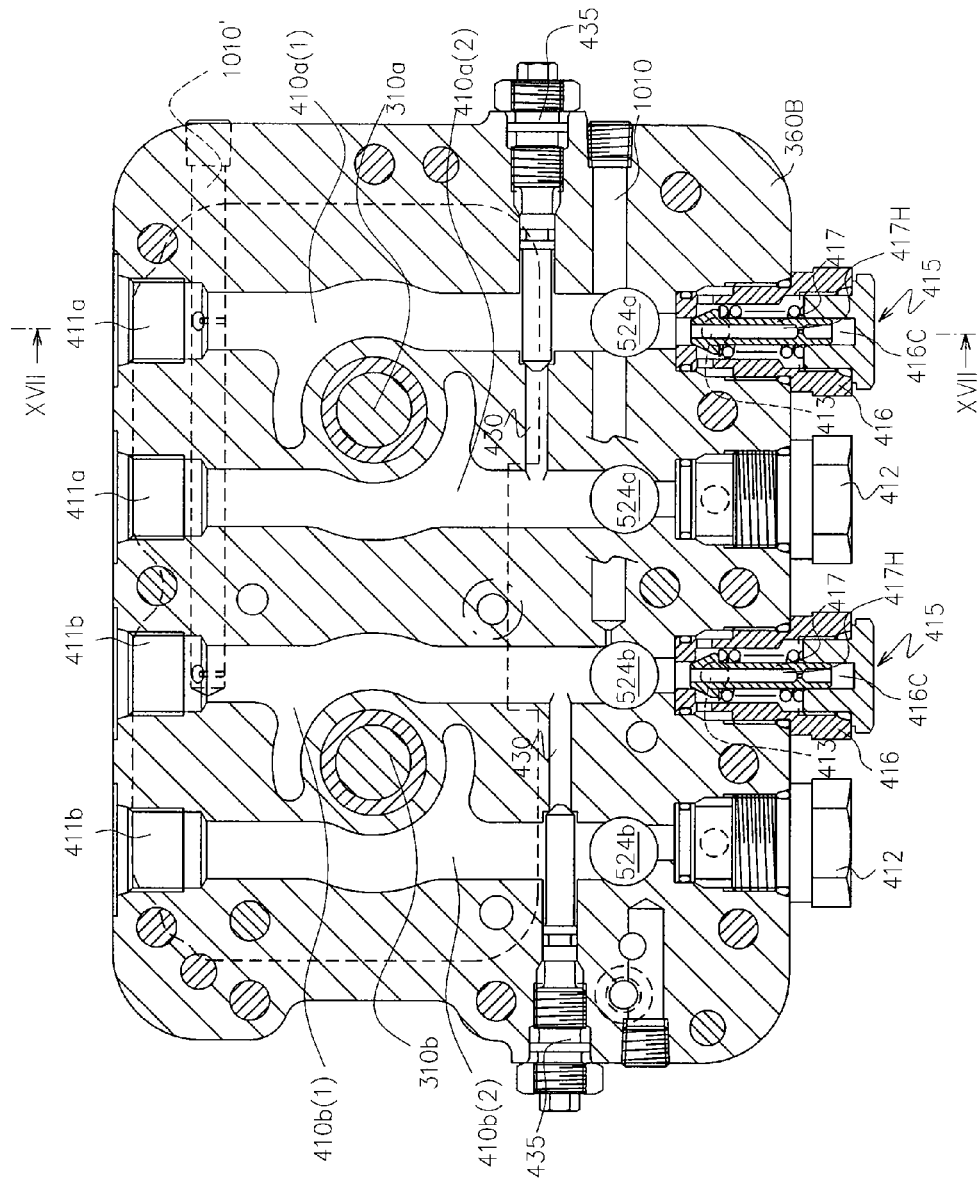
FIG. 16 is a longitudinal cross-sectional front view of a port block in the pump unit of the second embodiment.
Figure 17:
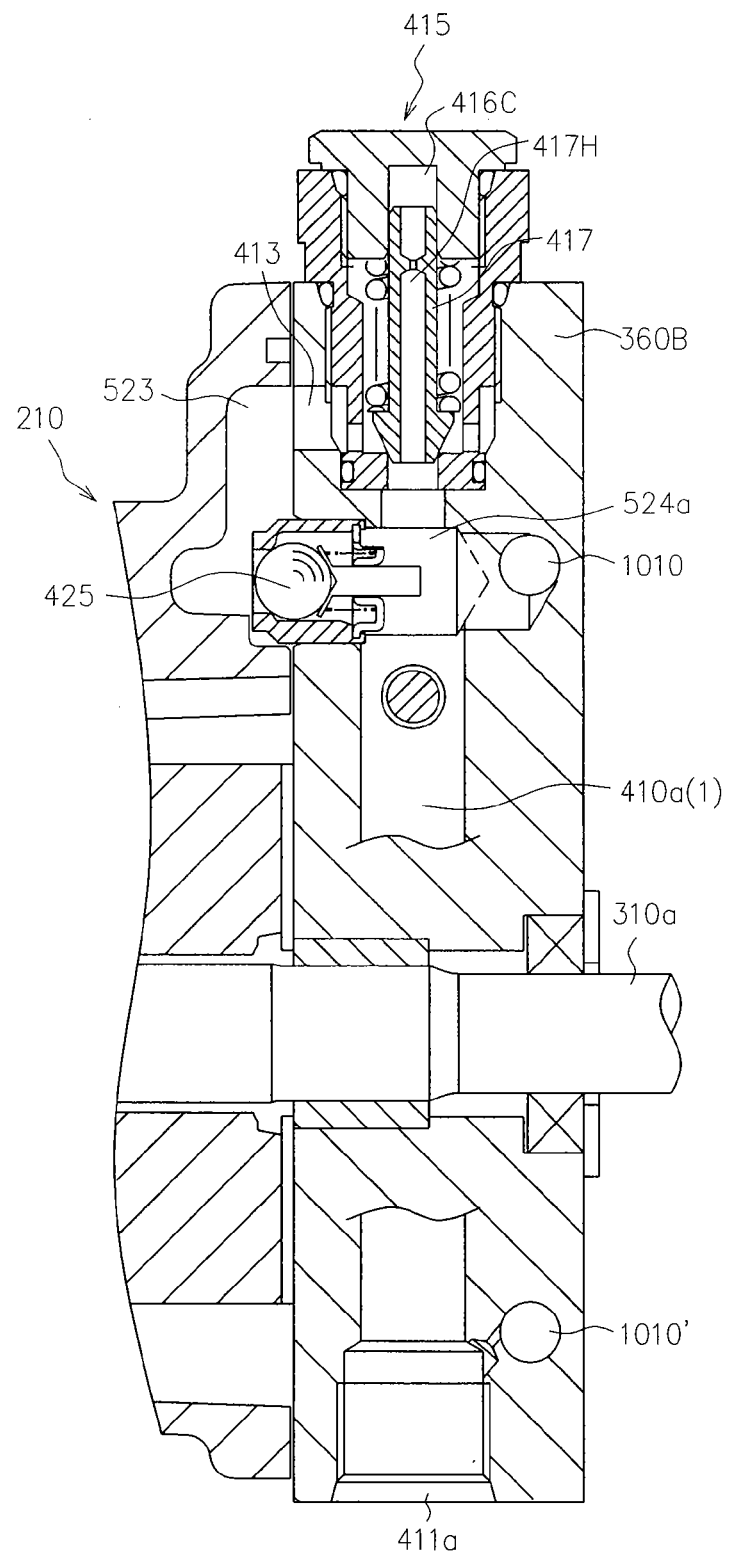
FIG. 17 is a cross sectional view taken along a line XVII-XVII in FIG. 16.

FIG. 16 illustrates a longitudinal cross-sectional front view of the port block 360B. Further, FIG. 17 illustrates a cross sectional view taken along a line XVII-XVII in FIG. 16.

As illustrated in FIG. 16, the port block 360B is provided with a pair of first hydraulic fluid passages 410*a* forming a part of the pair of first hydraulic fluid lines and a pair of second hydraulic fluid passages 410*b* forming a part of the pair of second hydraulic fluid lines 400*b*.

The pair of first hydraulic fluid passages 410*a* and the pair of second hydraulic fluid passages 410*b* have substantially the same structure. Consequently, detailed description of the pair of second hydraulic fluid passages 410*b* will be properly omitted by replacing the end reference character "a" of the pair of first hydraulic fluid passages 410*a* with "b".

Each of the pair of the first hydraulic fluid passages 410*a* includes a kidney port forming a fluid communication port to the corresponding first hydraulic pump main body 300*a* and a hydraulic fluid port 411*a* which is opened to the outer surface to form a fluid communication port to the first hydraulic motor unit 10*a*.

In this embodiment, as illustrated in FIG. 16, the pair of first hydraulic fluid passages 410*a* are formed in the port block 360B so as to have first ends and second ends opened to the outer surface, wherein the first ends form the hydraulic fluid ports 411*a* and the middle portions form the kidney ports.

Out of the pair of the first hydraulic fluid passages 410*a*, the forward-movement low-pressure side first hydraulic fluid passage 410*a*(2) is so configured that a plug 412 closes the second end, the forward-movement high-pressure side first hydraulic fluid passage 410*a*(1) is so configured that a relief valve 415 is mounted at the second end.

The relief valve 415 is provided in order to flow the hydraulic fluid from the forward-movement high-pressure side first hydraulic fluid passage 410*a*(1) to the forward-movement low-pressure side first hydraulic fluid passage 410*a*(2), in the event that the hydraulic pressure in the forward-movement high-pressure side first hydraulic fluid passage 410*a*(1) exceeds a predetermined hydraulic pressure, The relief valves 415 include a valve main body 417 which receives the hydraulic pressures in the corresponding forward-movement high-pressure side hydraulic fluid passages 410*a*(1) and 410*b*(1), the valve main body 417 having an axial hole 417H with an orifice, and a valve housing 416 having a pressure maintaining chamber 416C defined by the base end portion of the valve main body 417, the pressure maintaining chamber 416C being separated from a relief fluid passage 413 which will be described later.

By providing these structures, it is possible to slow the movement of the valve main bodies 417 with respect to the hydraulic pressure changes in the corresponding forward-movement high-pressure side hydraulic fluid passages 410*a*(1) and 410*b*(1), thus effectively preventing the occurrence of damping and/or chattering.

Further, the port block 360B is provided with a pair of bypass fluid passages 430 for communicating the pair of first hydraulic fluid passages 410*a* to each other and for communicating the pair of second hydraulic fluid passages 410*b* to each other, and a pair of switching valves 435 for opening/closing the pair of bypass fluid passages 430.

By providing these bypass fluid passages 430 and the switching valves 435, it is possible to prevent the occurrence of hydraulic pressure differences between the pair of first hydraulic fluid lines 400*a* and between the pair of second hydraulic fluid lines 400*b* when the vehicle is forcibly towed in the event of engine failures and the like.

Further, as illustrated in FIG. 16 and FIG. 17, the port block 360B is provided with a pair of first charge fluid passages 524*a* for supplying charge fluid from an auxiliary pump main body 510 provided in the pump unit 100B or a hydraulic fluid supplying apparatus such as the auxiliary pump unit placed separately from the pump unit 100B to the pair of first hydraulic fluid passages 400*a*, a pair of second charge fluid passages 524*b* for supplying charge fluid from the auxiliary pump main body or the hydraulic fluid supplying apparatus to the pair of second hydraulic fluid passages 400*b*, and check valves 425 (see FIG. 15) inserted in the pair of first charge fluid passages 524*a* and the pair of second charge fluid passages 524*b*.

The reference character 523 in FIG. 17 designates a charge fluid groove for supplying charge fluid from the auxiliary pump main body or the hydraulic fluid supplying apparatus to the pair of first charge fluid passages 524*a* and the pair of second charge fluid passages 524*b*.

The reference character 413 in FIG. 16 and FIG. 17 designates a relief fluid passage for communicating the secondary sides of the relief valves 415 to the charge fluid groove 523.

Further, as illustrated in FIG. 16, the communication fluid passage 1010 is formed in the port block 360B such that it communicates the forward-movement high-pressure side first hydraulic fluid passage 410*a*(1) and the forward-movement high-pressure side second hydraulic fluid passage 410*b*(1) to each other.

More specifically, in this embodiment, the pair of first hydraulic fluid passages 410*a* and the pair of second hydraulic fluid passages 410*b* are formed to be substantially parallel to each other at substantially the same position in the thickness wise direction of the port block 360B.

As illustrated in FIG. 15 and FIG. 16, the communication fluid passage 1010 is extended substantially in the direction orthogonal to the pair of first hydraulic fluid passages 410*a* and the pair of second hydraulic fluid passages 410*b* at a position displaced from the pair of first hydraulic fluid passages 410*a* and the pair of second hydraulic fluid passages 411*b* in the thickness wise direction of the port block 360B, such that it communicates only the forward-movement high-pressure side first hydraulic fluid passage 410*a* and the forward-movement high-pressure side second hydraulic fluid passage 410*b*(1) to each other.

While in this embodiment the communication fluid passage 1010 is formed at the same side as the bypass fluid passages 430 with respect to the first and second pump shafts 310*a* and 310*b*, and only a single orifice is provided as illustrated in FIG. 16, alternatively, a communication fluid passage 1010' may be formed at the opposite side from the bypass fluid passages 430 with respect to the first and second pump shafts 310*a* and 310*b*.

The communication fluid passage 1010' is provided with throttles at the positions communicated to both the forward-movement high-pressure side first hydraulic fluid passage 410*a*(1) and the forward-movement high-pressure side second hydraulic fluid passage 410*b*(1).

While in this embodiment the communication line 1000 is formed by the communication fluid passage 1010 (or 1010') formed in the port block 360B, the present invention is not limited to this configuration.

Figure 18:
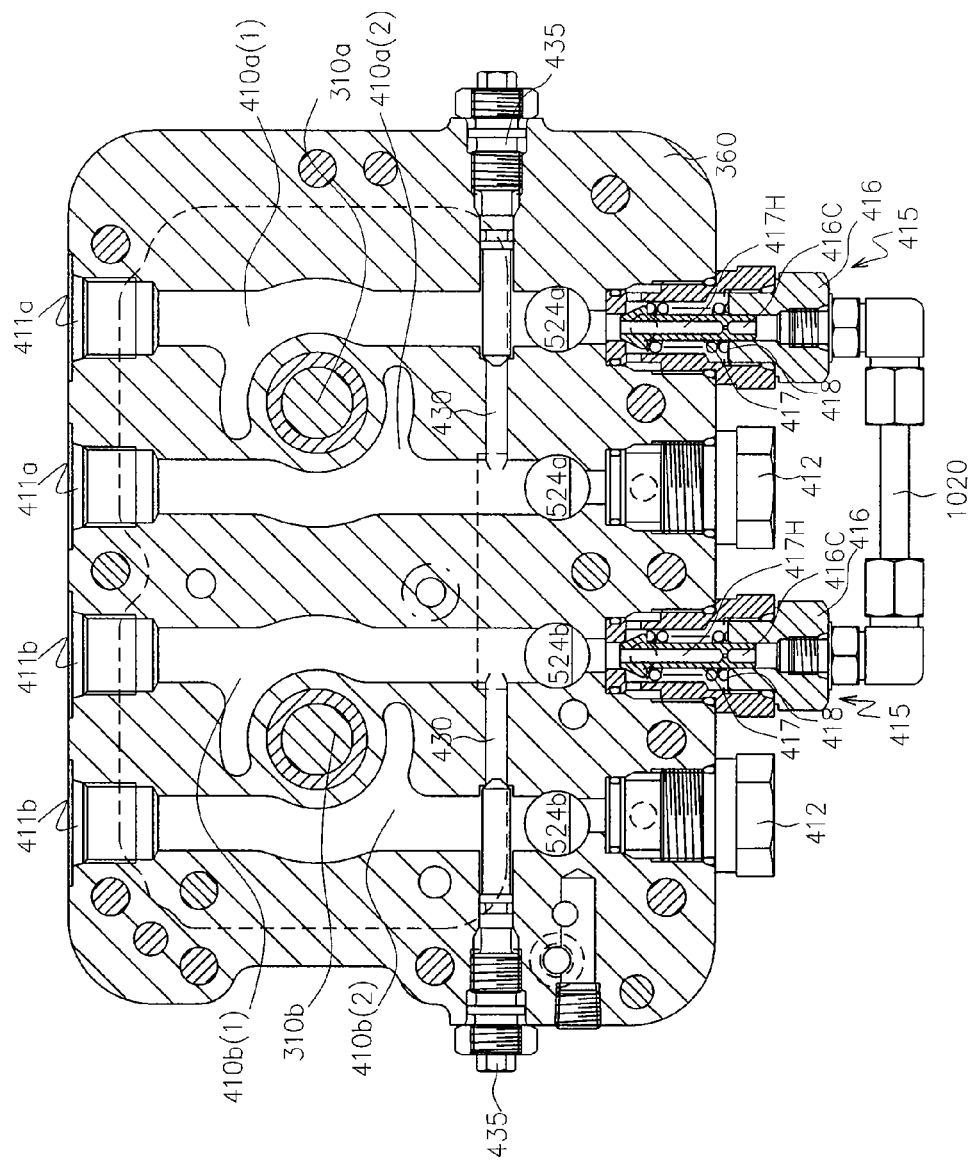
FIG. 18 is a longitudinal cross-sectional view of a port block in a modified pump unit of the present invention.

For example, as illustrated in FIG. 18, the forward-movement high-pressure side first hydraulic fluid passage 410a(1) and the forward-movement high-pressure side second hydraulic fluid passage 410b(1) may be communicated to each other through an external communication conduit 1020 connected to the port block 360.

More specifically, in the configuration illustrated in FIG. 18, the external communication conduit 1020 is configured to communicate the pressure maintaining chamber 416C of the relief valve 415 corresponding to the forward-movement high-pressure side first hydraulic fluid passage 410a(1) with the pressure maintaining chamber 416C of the relief valve 415 corresponding to the forward-movement high-pressure side second hydraulic fluid passage 410b(1).

With this configuration, it is possible to reduce the thickness of the port block 360 in comparison with the configuration illustrated in FIG. 16 and FIG. 17, and also it is possible to utilize the damping-chattering preventing orifices provided in the axial holes 417H in the relief valve main bodies 417 as the orifices 1100 inserted in the communication line 1000.

Figure 19:
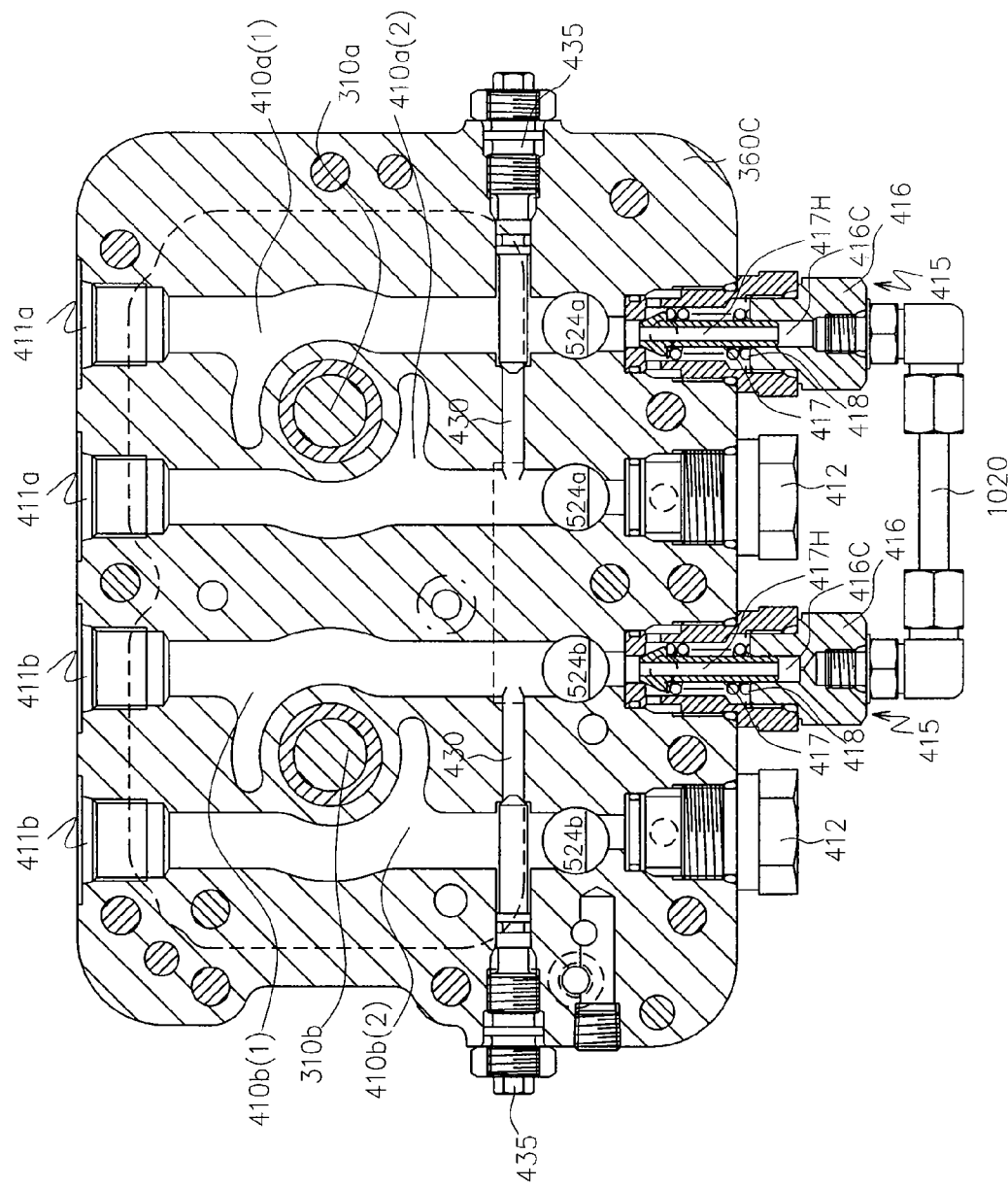
FIG. 19 is a longitudinal cross-sectional view of a port block in another modified pump unit of the present invention.

Also, in the configuration in which the communication line 1000 is formed by the external communication conduit 1020, it is possible to provide an orifice between the external communication conduit 1020, and at least one of the pressure maintaining chamber 416C in the relief valve 415 provided in the forward-movement high-pressure side first hydraulic fluid passage 410a(1) and the pressure maintaining chamber 416C in the relief valve 415 provided in the forward-movement high-pressure side second hydraulic fluid passage 410b(1), instead of the orifice provided in the axial hole 417H, as illustrated in FIG. 19.

Further, in the configurations illustrated in FIG. 16, FIG. 18 and FIG. 19, the pair of first hydraulic fluid passages 410a and the pair of second hydraulic fluid passages 410b are respectively concentrated at one side and the other side when viewed along the axes of the pump shafts 310a and 310b.

Specifically, in the aspects illustrated in FIG. 16, FIG. 18 and FIG. 19, between the forward-movement high-pressure side first hydraulic fluid passage 410a(1) and the forward-movement high-pressure side second hydraulic fluid passage 410b(1), there is placed one of the forward-movement low-pressure side hydraulic fluid passages (the forward-movement low-pressure side first hydraulic fluid passage 410a(2) in the illustrated aspect).

Figure 20:
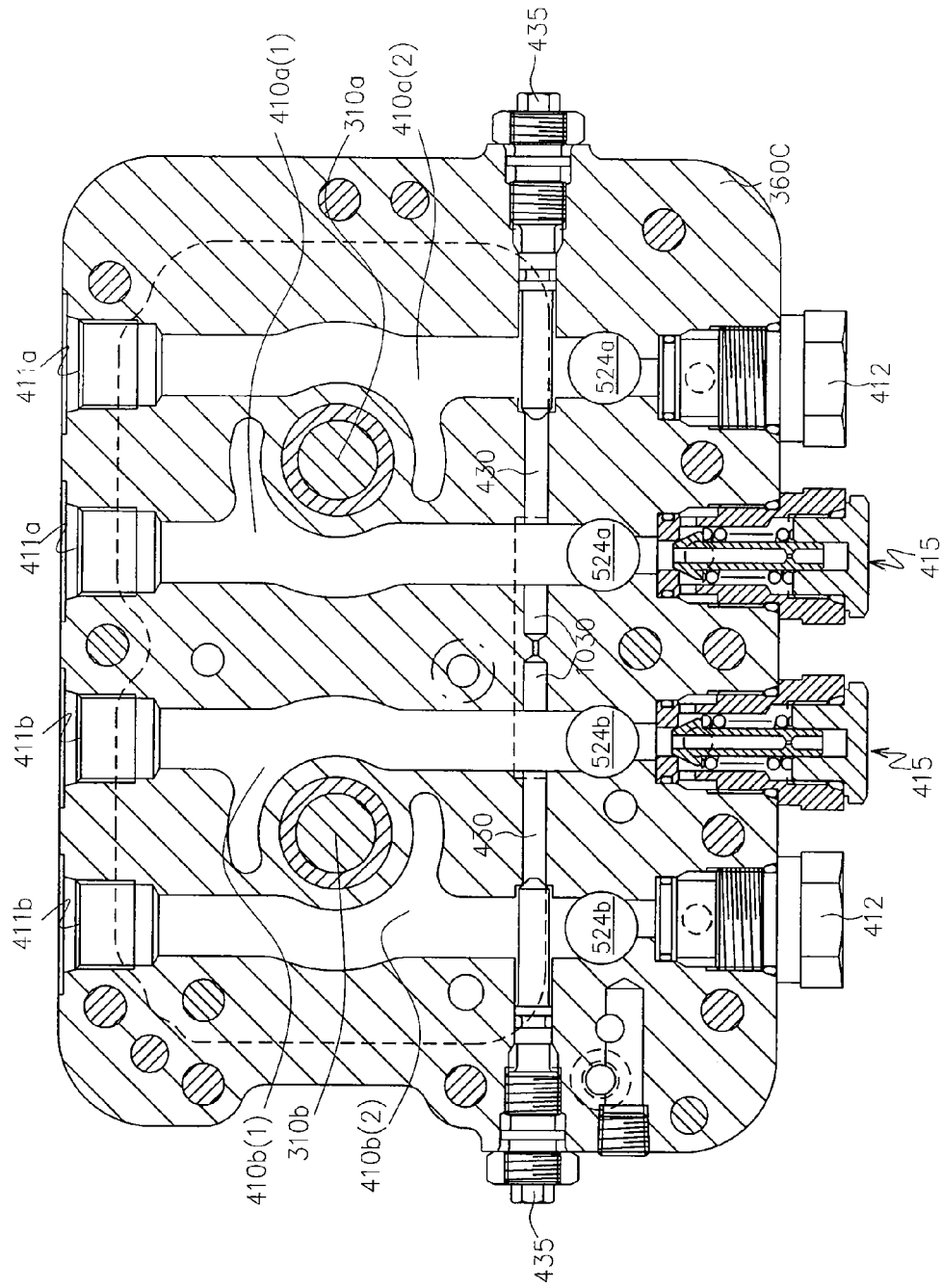
FIG. 20 is a longitudinal cross-sectional view of a port block in still another modified pump unit of the present invention.

Alternatively, as illustrated in FIG. 20, a port block 360C can be formed such that the forward-movement high-pressure side first hydraulic fluid passage 410a(1) is adjacent to the forward-movement high-pressure side second hydraulic fluid passage 410b(1). This enables easily forming the communication line 1000 by utilizing holes forming one or both of the pair of bypass fluid passages 430.

Namely, the forward-movement high-pressure side first hydraulic fluid passage 410a(1) and the forward-movement high-pressure side second hydraulic fluid passage 410b(1) may be placed adjacent to each other at the center portion of the port block 360C, while the forward-movement low-pressure side first hydraulic fluid passage 410a(2) and the forward-movement low-pressure side second hydraulic fluid passage 410b(2) may be placed at outer positions of the port block 360C. Further, one or both of the pair of bypass fluid passages 430 may be extended at their inner end portions and the extended fluid passages 1030 may be used to form the communication line 1000 for communicating the forward-movement high-pressure side first hydraulic fluid passage 410a(1) to the forward-movement high-pressure side second hydraulic fluid passage 410b(1).

In the aspect illustrated in FIG. 19, the pair of bypass fluid passages 430 are placed coaxially and both of the pair of bypass fluid passages 430 are extended at their inner end portions, wherein the orifice is formed between the opposite end portions of the pair of extended fluid passages 1030.

This specification is by no means intended to restrict the present invention to the preferred embodiments set forth therein. Various modifications to the pump unit, as well as the hydrostatic transmission as described herein, may be made by those skilled in the art without departing from the spirit and scope of the present invention as defined in the appended claims.

What is claimed is:

1. A pump unit configured to be capable of transmitting a rotational power from a driving power source which is operatively connected thereto to an actuator through a pair of hydraulic fluid lines, the pump unit comprising:

an input shaft which is operatively connected to the driving power source;
a hydraulic pump main body which is operatively driven by the input shaft and is fluidly connected to the actuator through the pair of hydraulic fluid lines;
a PTO shaft which is operatively driven by the input shaft;
a PTO clutch mechanism which is inserted in a transmission path from the input shaft to the PTO shaft;
an auxiliary pump main body;
a housing which accommodates the hydraulic pump main body and the PTO clutch mechanism;
a discharge line which is fluidly connected to a discharge port of the auxiliary pump main body;
a PTO hydraulic fluid line which is fluidly connected to the discharge line and supplies hydraulic fluid to the PTO clutch mechanism;
a PTO switching valve which selectively communicates or shuts off the PTO hydraulic fluid line;
a PTO relief valve which is positioned on a downstream side than the PTO switching valve in a flow direction of the hydraulic fluid and which sets the hydraulic pressure in the PTO hydraulic fluid line; and
an accumulator which is inserted in the PTO hydraulic fluid line so as to be positioned on a downstream side than the PTO switching valve in the flow direction of the hydraulic fluid for gradually raising the hydraulic pressure in the PTO hydraulic fluid line to the pressure set by the PTO relief valve, wherein
the housing includes a housing main body formed with an opening on a first side in a rotational axis line of the hydraulic pump main body, the opening having a size that allows the hydraulic pump main body to be passed therethrough; a port block detachably connected to the housing main body so as to liquid-tightly close the opening in a state of being contacted with the hydraulic pump main body, the port block being formed with a pair of hydraulic fluid passages forming parts of the pair of hydraulic fluid lines; an auxiliary pump case connected to an outer surface of the port block on a side opposite to the housing main body so as to surround the auxiliary pump main body; and a cover member connected to a second side of the housing main body which is opposite to the first side in the rotational axis line of the hydraulic pump main body;
the housing main body includes a first end-face portion provided with the opening, a second end-face portion which is positioned on an opposite side to the first end-face portion with respect to the rotational axis line of the hydraulic pump main body and to which the cover member is connected, and a wall portion extending in the rotation axis line of the hydraulic pump main body between the first end-face portion and the second end-face portion;

the PTO shaft is supported in a rotatable manner around its axis line by the first end-face portion and the cover member in a state where its distal end extends outward from the housing and its proximal end terminates within the cover member;

the PTO hydraulic fluid line is configured so as to lead a part of a pressurized fluid discharged from the auxiliary pump main body that is positioned on the first side in the rotational axis line of the hydraulic pump main body to the cover member that is positioned on the second side in the rotational axis line of the hydraulic pump main body through the housing main body, and supply the same into a PTO hydraulic fluid passage formed in the PTO shaft through a rotary joint formed between the cover member and the proximal end of the PTO shaft; and the accumulator is incorporated within the first end-face portion of the housing main body so as to be positioned between the port block and the cover member in the rotational axis line of the hydraulic pump main body in a state of being fluidly connected with the PTO hydraulic fluid line and having an axis line orthogonal to the rotational axis line of the hydraulic pump main body.

2. A pump unit configured to be capable of transmitting a rotational power from a driving power source which is operatively connected thereto to an actuator through a pair of hydraulic fluid lines, the pump unit comprising;

an input shaft which is operatively connected to the driving power source;

a hydraulic pump main body which is operatively driven by the input shaft and is fluidly connected to the actuator through the pair of hydraulic fluid lines;

a PTO shaft which is operatively driven by the input shaft;

a PTO clutch mechanism which is inserted in a transmission path from the input shaft to the PTO shaft;

an auxiliary pump main body;

a housing which accommodates the hydraulic pump main body and the PTO clutch mechanism;

a discharge line which is fluidly connected to a discharge port of the auxiliary pump main body;

a PTO hydraulic fluid line which is fluidly connected to the discharge line and supplies hydraulic fluid to the PTO clutch mechanism;

a PTO switching valve which selectively communicates or shut off the PTO hydraulic fluid line;

a PTO relief valve which is positioned on a downstream side than the PTO switching valve in a flow direction of the hydraulic fluid and which sets the hydraulic pressure in the PTO hydraulic fluid line; and an accumulator which is inserted in the PTO hydraulic fluid line so as to be positioned on a downstream side than the PTO switching valve in the flow direction of the hydraulic fluid for gradually raising the hydraulic pressure in the PTO hydraulic fluid line to the pressure set by the PTO relief valve, wherein the housing includes a housing main body formed with an opening on a first side in a rotational axis line of the hydraulic pump main body, the opening having a size that allows the hydraulic pump main body to be passed therethrough; a port block detachably connected to the housing main body so as to liquid-tightly close the opening in a state of being contacted with the hydraulic pump main body, the port block being formed with a pair of hydraulic fluid passages forming parts of the pair of hydraulic fluid lines; an auxiliary pump case connected to an outer surface of the port block on a side opposite to the housing main body so as to surround the auxiliary pump main body; and a cover member connected to a second side of the housing main body which is opposite to the first side in the rotational axis line of the hydraulic pump main body;

the housing main body includes a first end-face portion provided with the opening, a second end-face portion which is positioned on an opposite side to the first end-face portion with respect to the rotational axis line of the hydraulic pump main body and to which the cover member is connected, and a wall portion extending in the rotation axis line of the hydraulic pump main body between the first end-face portion and the second end-face portion;

the PTO shaft is supported in a rotatable manner around its axis line by the first end-face portion and the cover member in a state where its distal end extends outward from the housing and its proximal end terminates within the cover member;

the PTO hydraulic fluid line is configured so as to lead a part of a pressurized fluid discharged from the auxiliary pump main body that is positioned on the first side in the rotational axis line of the hydraulic pump main body to the cover member that is positioned on the second side in the rotational axis line of the hydraulic pump main body through the housing main body, and supply the same into a PTO hydraulic fluid passage formed in the PTO shaft through a rotary joint formed between the cover member and the proximal end of the PTO shaft; and the accumulator is incorporated within the wall portion of the housing main body so as to be positioned between the port block and the cover member in the rotational axis line of the hydraulic pump main body in a state of being fluidly connected with the PTO hydraulic fluid line and having an axis line parallel to the rotational axis line of the hydraulic pump main body.

3. A hydrostatic transmission which non-stepwisely changes a speed of a rotational power from a driving power source which is operatively connected thereto by means of hydraulic actions, the hydrostatic transmission comprising:

an input shaft which is operativdv connected to the driving power source;

a hydraulic pump main body which is operatively driven by the input shaft;

a hydraulic motor main body which is fluidly connected to the hydraulic pump main body;

a motor shaft which is rotated and driven by the hydraulic motor main body;

a PTO shaft which is operatively driven by the input shaft;

a PTO clutch mechanism which is inserted in a transmission path from the input shaft to the PTO shaft;

an auxiliary pump main body;

a housing which accommodates the hydraulic pump main body, the hydraulic motor main body and the PTO clutch mechanism;

a discharge line which is fluidly connected to a discharge port of the auxiliary pump main body;

a PTO hydraulic fluid line which is fluidly connected to the discharge line and supplies hydraulic fluid to the PTO clutch mechanism;

a PTO switching valve which selectively communicates or shut off the PTO hydraulic fluid line;

a PTO relief valve which is positioned on a downstream side than the PTO switching valve in a flow direction of the hydraulic fluid and which sets the hydraulic pressure in the PTO hydraulic fluid line; and an accumulator which is inserted in the PTO hydraulic fluid line so as to be positioned on a downstream side than the PTO switching valve in the flow direction of the hydraulic fluid for gradually raising the hydraulic pressure in the PTO hydraulic fluid line to the pressure set by the PTO relief valve, wherein the housing includes a housing main body formed with an opening on a first side in a rotational axis line of the hydraulic pump main body, the opening having a size that allows the hydraulic pump main body and the hydraulic motor main body to be passed therethrough; a port block detachably connected to the housing main body so as to liquid-tightly close the opening in a state of being contacted with the hydraulic pump main body and the hydraulic motor main body, the port block being formed with a pair of hydraulic fluid passages that fluidly connects between the hydraulic pump main body and the hydraulic motor main body; an auxiliary pump case connected to an outer surface of the port block on a side opposite to the housing main body so as to surround the auxiliary pump main body; and a cover member connected to a second side of the housing main body which is opposite to the first side in the rotational axis line of the hydraulic pump main body;

the housing main body includes a first end-face portion provided with the opening, a second end-face portion positioned at the opposite side from the first end-face portion with respect to the rotational axis line of the hydraulic pump main body and a wall portion extending in the rotational axis line of the hydraulic pump main body between the first end-face portion and the second end-face portion, the PTO shaft is supported in a rotatable manner around its axis line by the first end-face portion and the cover member in a state where its distal end extends outward from the housing and its proximal end terminates within the cover member;

the PTO hydraulic fluid line is configured so as to lead a part of a pressurized fluid discharged from the auxiliary pump main body that is positioned on the first side in the rotational axis line of the hydraulic pump main body to the cover member that is positioned on the second side in the rotational axis line of the hydraulic pump main body through the housing main body, and supply the same into a PTO hydraulic fluid passage formed in the PTO shaft through a rotary joint formed between the cover member and the proximal end of the PTO shaft; and the accumulator is incorporated within the first end-face portion of the housing main body so as to be positioned between the port block and the cover member in the rotational axis line of the hydraulic pump main body in a state of being fluidly connected with the PTO hydraulic fluid line and having an axis line orthogonal to the rotational axis line of the hydraulic pump main body.

4. A hydrostatic transmission which non-stepwisely changes a speed of a rotational power from a driving power source which is operatively connected thereto by means of hydraulic actions, the hydrostatic transmission comprising:

an input shaft which is operatively connected to the driving power source;

a hydraulic pump main body which is operatively driven by the input shaft;

a hydraulic motor main body which is fluidly connected to the hydraulic pump main body;

a motor shaft which is rotated and driven by the hydraulic motor main body;

a PTO shaft which is operatively driven by the input shaft;

a PTO clutch mechanism which is inserted in a transmission path from the input shaft to the PTO shaft;

an auxiliary pump main body;

a housing which accommodates the hydraulic pump main body, the hydraulic motor main body and the PTO clutch mechanism;

a discharge line which is fluidly connected to a discharge port of the auxiliary pump main body;

a PTO hydraulic fluid line which is fluidly connected to the discharge line and supplies hydraulic fluid to the PTO clutch mechanism;

a PTO switching valve which selectively communicates or shut off the PTO hydraulic fluid line;

a PTO relief valve which is positioned on a downstream side than the PTO switching valve in a flow direction of the hydraulic fluid and which sets the hydraulic pressure in the PTO hydraulic fluid line; and an accumulator which is inserted in the PTO hydraulic fluid line so as to be positioned on a downstream side than the PTO switching valve in the flow direction of the hydraulic fluid for gradually raising the hydraulic pressure in the PTO hydraulic fluid line to the pressure set by the PTO relief valve, wherein the accumulator is incorporated within the wall portion of the housing main body so as to be positioned between the port block and the cover member in the rotational axis line of the hydraulic pump main body in a state of being fluidly connected with the PTO hydraulic fluid line and having an axis line parallel to the rotational axis line of the hydraulic pump main body.

5. A pump unit configured to be capable of transmitting a rotational power from a driving power source which is operatively connected thereto to an actuator through a pair of hydraulic fluid lines, the pump unit comprising:

a pump shaft operatively connected to the driving power source;

a hydraulic pump main body supported by the pump shaft in a relatively non-rotatable manner and fluidly connected to the actuator through the pair of hydraulic fluid lines;

a PTO shaft disposed parallel to the pump shaft in a state of being operatively connected to the driving power source;

a PTO clutch mechanism supported by the PTO shaft in a state of being inserted in a transmission path from the driving power source to the PTO shaft;

a housing which accommodates the hydraulic pump main body and the PTO clutch mechanism, and supports the pump shaft in a rotatable manner around its axis line and the PTO shaft in a rotatable manner around its axis line in a state where an end portion of the PTO shaft positioned on a first side in a rotational axis line of the pump shaft extends outward from the housing;

an auxiliary pump main body mounted on the first side of the housing in the rotational axis line of the pump shaft in a state of being operatively connected to the driving power source;

the PTO hydraulic fluid line which supplies a part of a pressurized fluid discharged from the auxiliary pump main body that is positioned on the first side of the housing in the rotational axis line of the hydraulic pump main body to the PTO clutch mechanism supported by the PTO shaft through a rotary joint provided on a second side of the housing which is opposite to the first side with respect to the rotational axis line of the hydraulic pump main body and a PTO hydraulic fluid passage formed in the PTO shaft;

a PTO relief valve for setting the hydraulic pressure in the PTO hydraulic fluid line; and an accumulator which is inserted in the PTO hydraulic fluid line for gradually raising the hydraulic pressure in the PTO hydraulic fluid line to the pressure set by the PTO relief valve, wherein the accumulator is incorporated in the housing between the first and second sides of the housing in the rotational axis line of the hydraulic pump main body in a state of being fluidly connected with the PTO hydraulic fluid line and having an axis line orthogonal to the rotational axis line of the hydraulic pump main body.

6. A hydrostatic transmission which non-stepwisely changes a speed of a rotational power from a driving power source which is operatively connected thereto by means of hydraulic actions, the hydrostatic transmission comprising:

a pump shaft operatively connected to the driving power source;

a hydraulic pump main body supported by the pump shaft in a relatively non-rotatable manner a hydraulic motor main body fluidly connected to the hydraulic pump main body;

a motor shaft rotatably driven by the hydraulic motor main body;

a PTO shaft disposed parallel to the pump shaft in a state of being operatively connected to the driving power source;

a PTO clutch mechanism supported by the PTO shaft in a state of being inserted in a transmission path from the driving power source to the PTO shaft;

a housing which accommodates the hydraulic pump main body, the hydraulic motor main body and the PTO clutch mechanism, and supports the pump shaft and the motor shaft in a rotatable manner around respective axis lines and the PTO shaft in a rotatable manner around its axis line in a state where an end portion of the PTO shaft positioned on a first side in a rotational axis line of the pump shaft extends outward from the housing;

an auxiliary pump main body mounted on the first side of the housing in the rotational axis line of the pump shaft in a state of being operatively connected to the driving power source;

the PTO hydraulic fluid line which supplies a part of a pressurized fluid discharged from the auxiliary pump main body that is positioned on the first side of the housing in the rotational axis line of the hydraulic pump main body to the PTO clutch mechanism supported by the PTO shaft through a rotary joint provided on a second side of the housing which is opposite to the first side with respect to the rotational axis line of the hydraulic pump main body and a PTO hydraulic fluid passage formed in the PTO shaft;

a PTO relief valve for setting the hydraulic pressure in the PTO hydraulic fluid line; and an accumulator which is inserted in the PTO hydraulic fluid line for gradually raising the hydraulic pressure in the PTO hydraulic fluid line to the pressure set by the PTO relief valve, wherein the accumulator is incorporated in the housing between the first and second sides of the housing in the rotational axis line of the hydraulic pump main body in a state of being fluidly connected with the PTO hydraulic fluid line and having an axis line orthogonal to the rotational axis line of the hydraulic pump main body.

* * * * *